United States Patent
Hyatt et al.

(10) Patent No.: US 8,246,026 B2
(45) Date of Patent: Aug. 21, 2012

(54) TOOL INDEXER AND TURRET-INDEXER ASSEMBLY

(75) Inventors: Gregory Hyatt, South Barrington, IL (US); Abhijit Sahasrabudhe, Wheeling, IL (US)

(73) Assignee: Mori Seiki USA, Inc., Rolling Meadows, IL (US)

(*) Notice: Subject to any disclaimer, the term of this patent is extended or adjusted under 35 U.S.C. 154(b) by 893 days.

(21) Appl. No.: 12/249,514

(22) Filed: Oct. 10, 2008

(65) Prior Publication Data

US 2009/0095126 A1    Apr. 16, 2009

Related U.S. Application Data

(60) Provisional application No. 60/998,252, filed on Oct. 10, 2007.

(51) Int. Cl.
*B23Q 1/25* (2006.01)
*B23Q 3/18* (2006.01)
*B23Q 3/00* (2006.01)
*B25B 1/20* (2006.01)
*B23B 3/16* (2006.01)
*B23B 7/04* (2006.01)

(52) U.S. Cl. ........... 269/55; 269/45; 269/60; 269/289 R; 29/40; 29/35.5

(58) Field of Classification Search ............ 269/55; 29/252, 255, 270, 278, 244, 40, 35.5, 39, 29/27 C See application file for complete search history.

(56) References Cited

U.S. PATENT DOCUMENTS

| | | | | |
|---|---|---|---|---|
| 2,369,425 A | * | 2/1945 | Becker | 269/85 |
| 3,590,463 A | * | 7/1971 | Burroughs et al. | 483/1 |
| 3,760,472 A | * | 9/1973 | Kielma et al. | 29/40 |
| 4,429,443 A | * | 2/1984 | Kolblin et al. | 29/26 A |
| 4,597,144 A | * | 7/1986 | Frank et al. | 483/37 |
| 5,031,295 A | * | 7/1991 | Schmitt | 29/33 J |
| 6,134,998 A | * | 10/2000 | Loeffler et al. | 82/162 |
| 7,395,589 B1 | | 7/2008 | Kuo | |
| 2002/0081166 A1 | | 6/2002 | Kosmowski | |
| 2006/0218764 A1 | * | 10/2006 | Hashimoto et al. | 29/27 C |
| 2007/0209179 A1 | * | 9/2007 | Williams et al. | 29/27 C |

FOREIGN PATENT DOCUMENTS

| | | |
|---|---|---|
| DE | 3715676 | 11/1987 |
| DE | 102007042288 | 9/2008 |
| EP | 1547726 | 6/2005 |

OTHER PUBLICATIONS

The International Search Report and the Written Opinion of the International Searching Authority dated Jan. 26, 2009.

* cited by examiner

*Primary Examiner* — Monica Carter
*Assistant Examiner* — Nirvana Deonauth
(74) *Attorney, Agent, or Firm* — Miller, Matthias & Hull LLP

(57) ABSTRACT

Disclosed are a tool indexer assembly, a computer numerically controlled machine that includes such tool indexer assembly, and associated methods. The assembly in one embodiment includes a turret and an indexer, the indexer including a portion that is movable with respect to the turret and that includes plural tool station configured to receive plural tool structures. The tool indexer is disposed on a facet of the turret, and, in some embodiments includes a table that is rotatable about an axis that is generally orthogonal to the axis of rotation of the turret. In another embodiment, a tool indexer includes a clamping mechanism having a source of pressurized fluid and a piston that is hydraulically actuated by the pressurized fluid and movable to a clamping position. The assembly further includes a conduit for delivery of the pressurized fluid proximal the tool structure as coolant fluid.

4 Claims, 21 Drawing Sheets

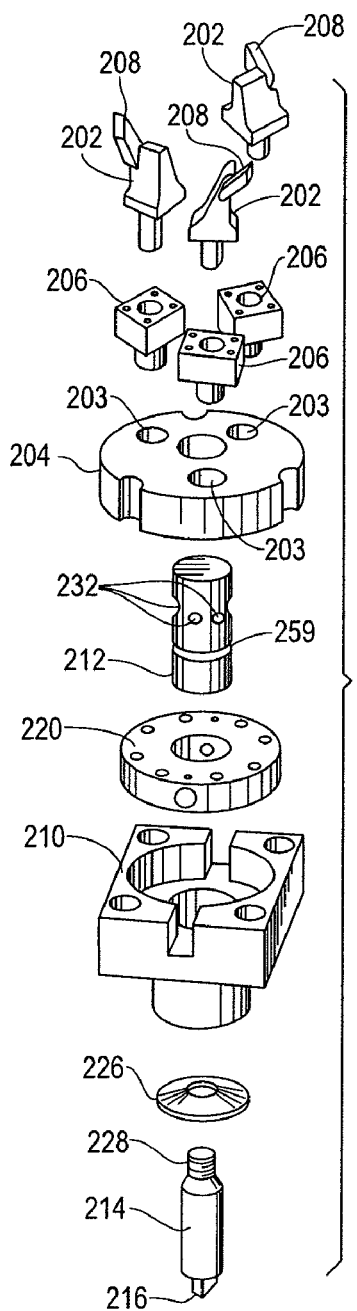
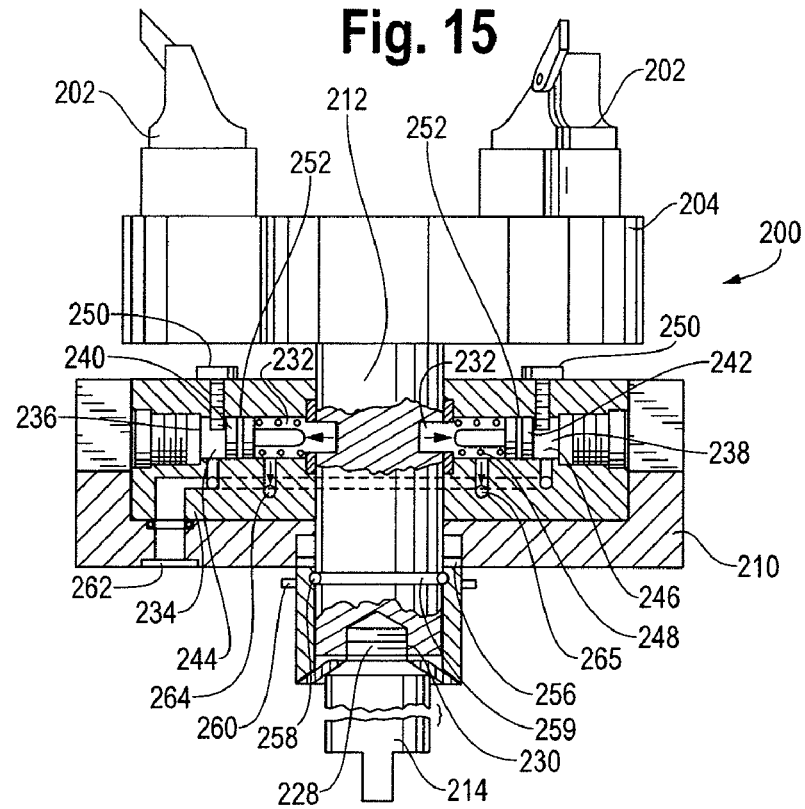
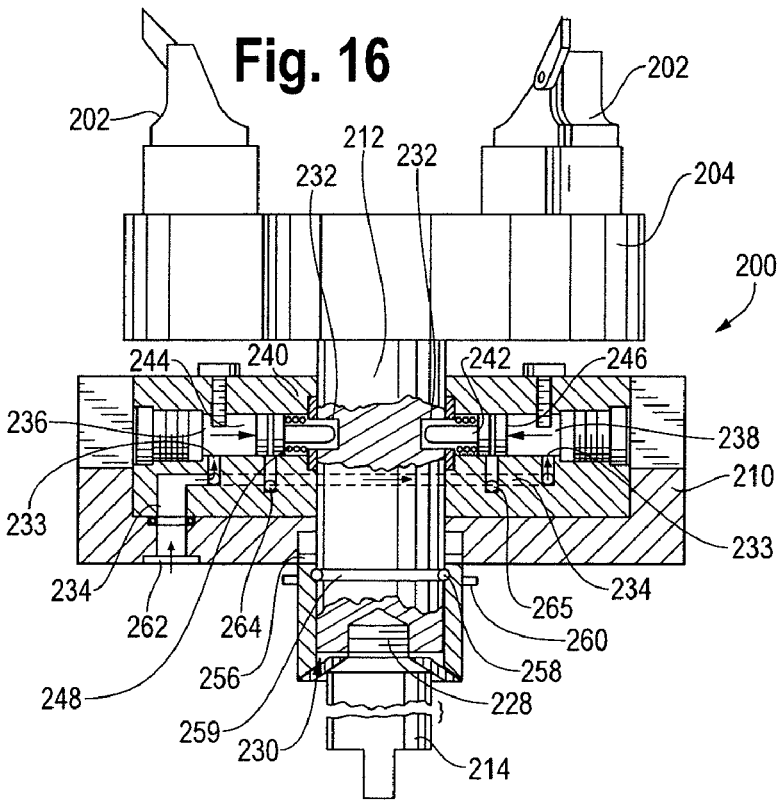

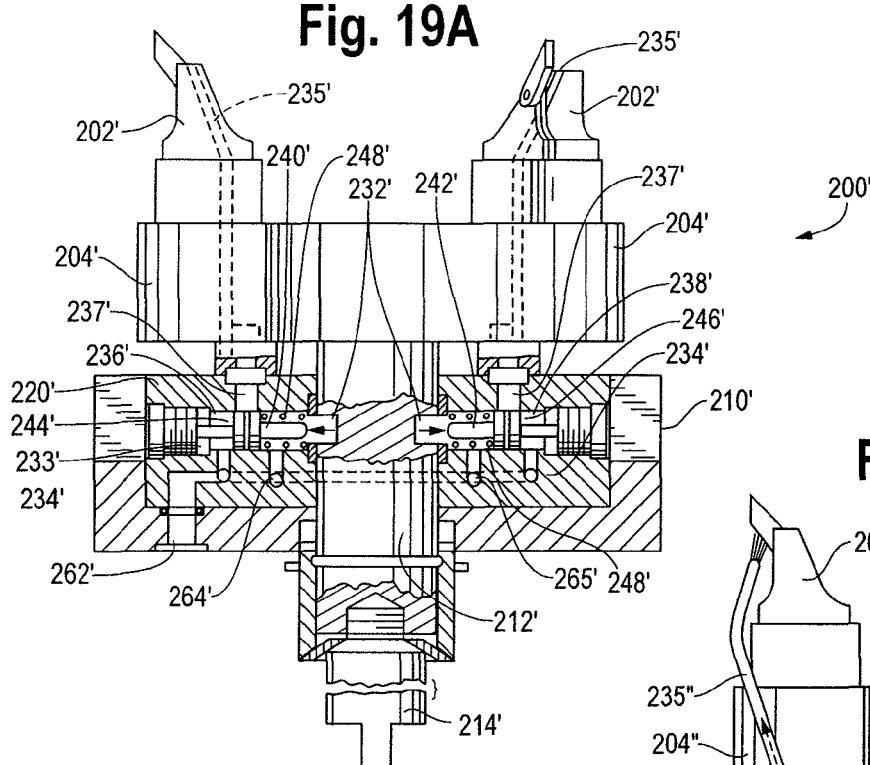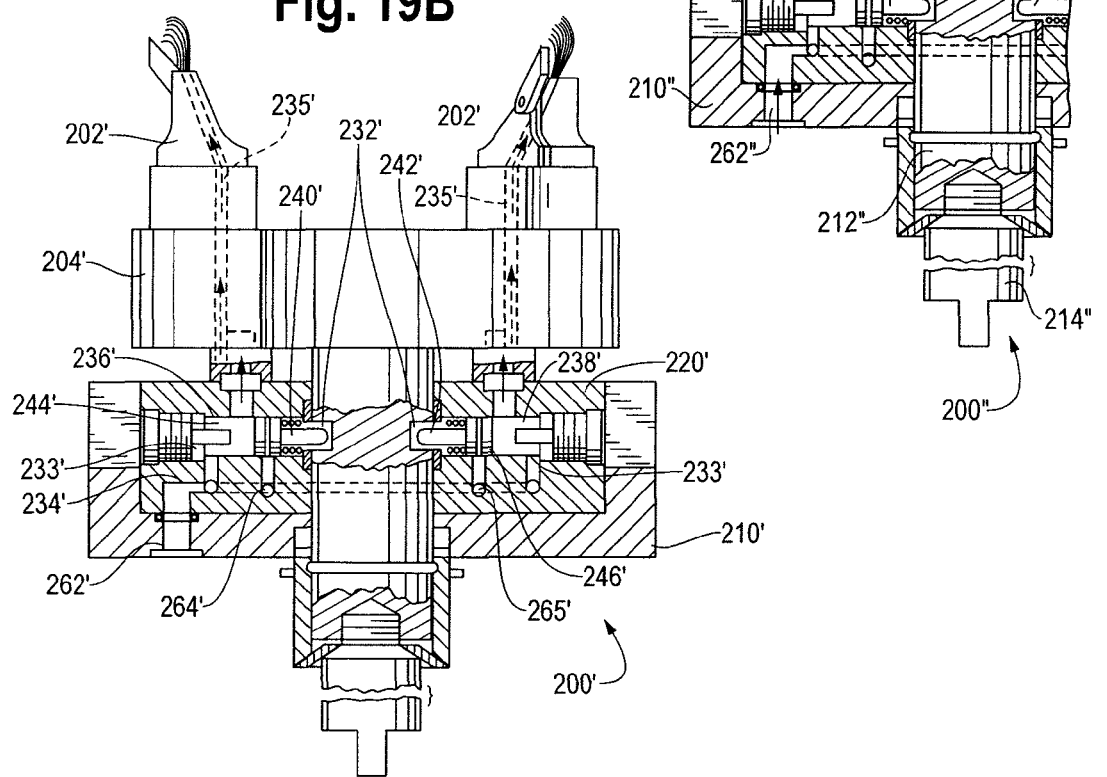

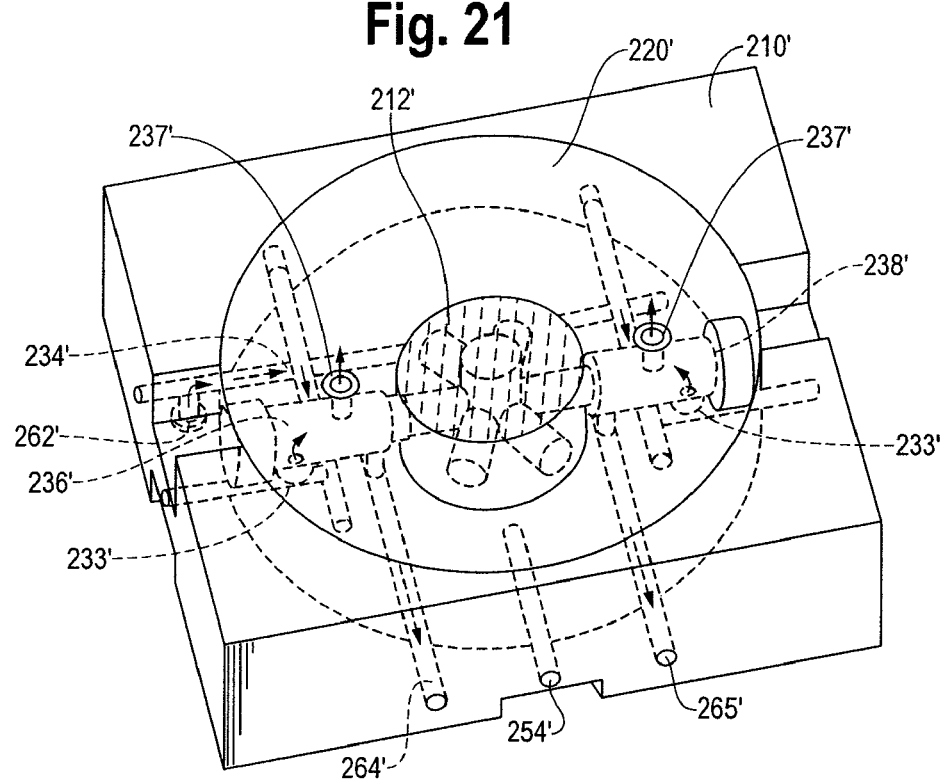
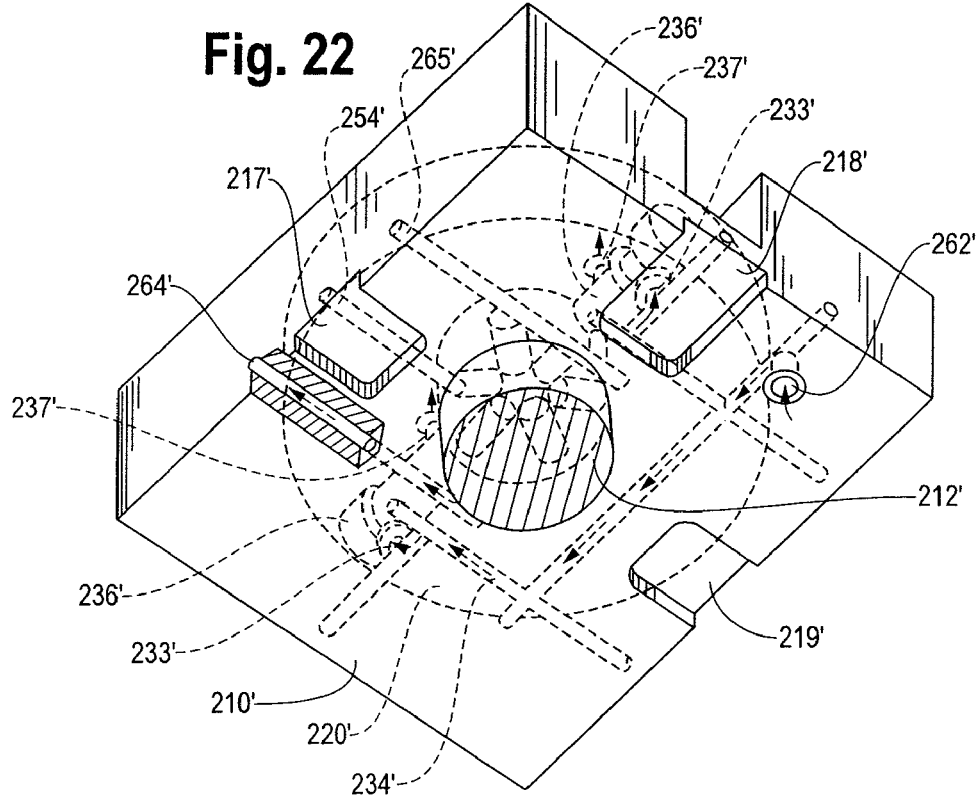

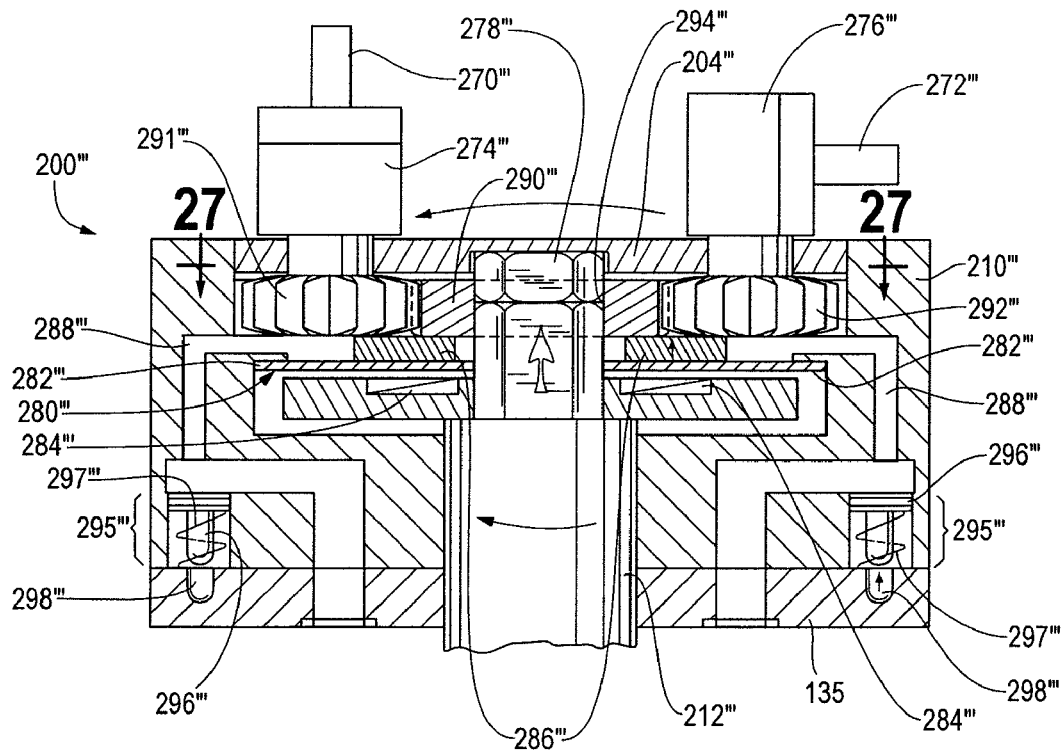
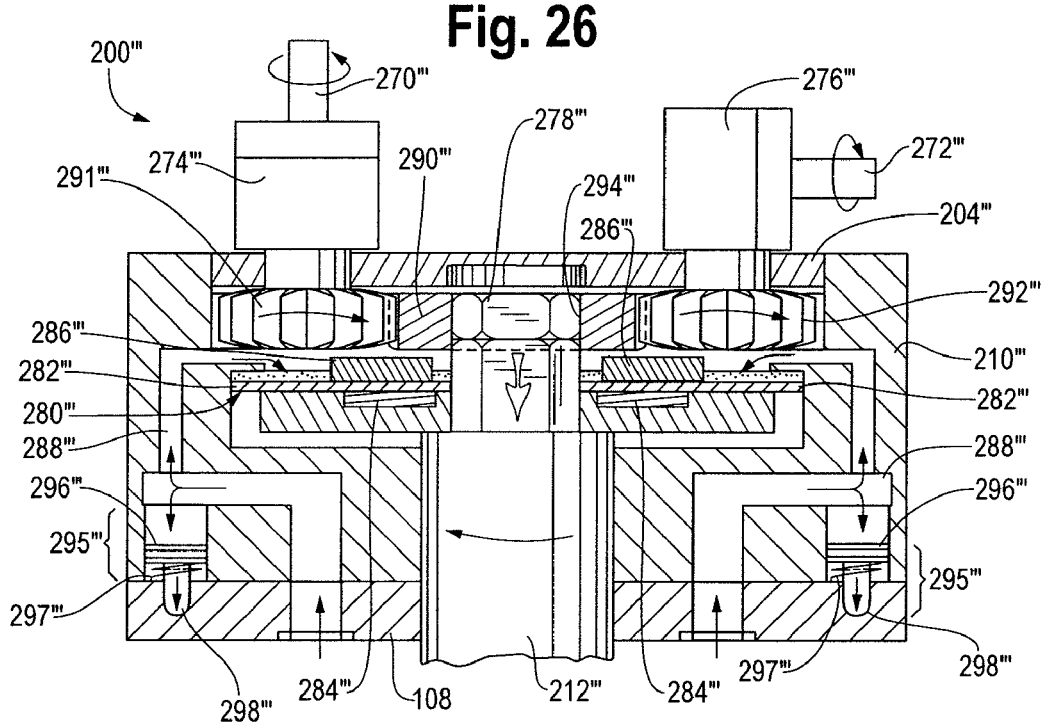

TOOL INDEXER AND TURRET-INDEXER ASSEMBLY

RELATED APPLICATION

The present application claims the benefit of U.S. Provisional Application Ser. No. 60/998,252, filed Oct. 10, 2007, the entire contents of which are hereby incorporated by reference.

TECHNICAL FIELD

The invention is in the field of computer numerically controlled machines.

BACKGROUND

Many computer numerically controlled machines have been described in the art. Mori Seiki USA, Inc. the assignee of the present application, markets a number of computer numerically controlled machines, including the NT-Series integrated mill turn center, the ZT-Series multi-tasking turning center, the NV-Series and NH-Series vertical and horizontal machining centers, the NM-Series multi-axis machining centers, and the NL-series lathes. In these and other computer numerically controlled machines, generally one or more cutting tools are brought into contact with a workpiece under a level of computer control to cause removal of material from the workpiece. Various operations are contemplated, these including milling operations, turning operations, broaching operations and many other conventional such operations.

In such operations, it is periodically necessary to change from one tool to another tool. Particularly in high volume and high precision operations, it is necessary to change tools frequently, and for this reason it is desirable to provide in the machine associated components that enable tools to be changed quickly and readily. To this end, many computer numerically controlled machines are equipped with tool changing facilities, such as turrets and automatic tool changers. For instance, in the NT- and NZ-Series of machines, one or conventional more turrets are provided, each turret rotating about an axis of rotation and presenting plural facets to a working position. When a facet is in the working position, a tool mounted thereon may be brought proximal to a workpiece and caused to engage the workpiece for material removal. In many cases, the tool can be driven by a motor when in the working position. In other embodiments, stationary tools are placed on facets of the turret to be used, for example, in various turning operations. Other approaches to increasing the number of tools available in a machine have been described, for instance, in U.S. Pat. No. 6,536,317, assigned to Yamakazi Mazak Kabushiki Kaisha; U.S. Patent Application Publication No. 2006/10075858 assigned to Sandvik, and International Patent Application No. 2004/1022288, assigned to Kennametal, Inc. Similarly, turret designs other than the heretofore turrets are known; many examples of which are commercially available from Sauter Feinmechanik GmbH of Germany.

It remains desirable to provide an increase in the number and variety of tools available in a computer numerically controlled machine as compared with the use of a convention turret as described herein.

SUMMARY

It has now been found that it is possible to increase the number of tools via the provision of a turret-indexer assembly. In one embodiment, a turret-indexer assembly employs a turret having plural facets and at least one working position, the turret being rotatable to expose one of the facets to the working position. Also provided is an indexer that is disposed on one of the facets, the indexer including a tool structure receiving portion that comprises a plurality of tool stations. The tool stations are configured respectively to receive a plurality of tool structures, which may be tools, linkages for tools, or other instrumentalities such as gauges, coolant wands, other measuring devices, or the like. The tool structure receiving portion is movable with respect to the turret to allow movement of the tool stations with respect to the turret when the indexer is in a working position. Optionally, but preferably, the turret motor is used to index the tool stations.

In one embodiment, an apparatus is provided, the apparatus including a workpiece holder and a turret-indexer assembly. Also provided is a computer controlled system that includes a computer readable medium having computer-executable code disposed thereon. The control system is operatively coupled to the assembly and to the workpiece holder and includes code for causing relative movement of the assembly and the workpiece holder and further comprising code for causing indexing movement of the tool structure receiving portion.

As discussed in more detail hereinbelow, it is also desired in most cases to provide a clamping function for the tool indexer. Clamping is desired principally to inhibit vibration and displacement of the tool structure receiving portion and associated tools. In one embodiment, not mutually exclusive with respect to the above embodiment and in fact that is preferably used in conjunction therewith, an apparatus that comprises a housing and a tool structure receiving portion that is movable with respect to the housing is provided. The apparatus further comprises a clamping mechanism, the clamping mechanism comprising a source of pressurized fluid and a piston that is capable of actuation to cause movement of the piston to a clamping position and engaging the tool structure receiving portion upon actuation. In another embodiment the pistons engage the turret. Also provided is a conduit for delivery of the pressurized fluid as coolant. This apparatus may be provided as part of the turret-indexer assembly described hereinabove. Alternatively, an indexing assembly that includes such clamping mechanism may be provided for use on the turret or elsewhere within the computer numerically controlled machine, such as on the tail stock or upper spindle. A turret-indexer assembly as described hereinabove may include a clamping mechanism, either with or without a conduit for delivery of pressurized fluid as coolant.

DESCRIPTION OF THE FIGURES

FIG. 14 is an exploded view of the indexer illustrated in FIG. 10;

FIG. 15 is a partially cut-away front elevational view of the indexer, showing the clamping mechanism of the indexer in an unclamped position;

FIG. 16 is a partially cut-away front elevational view similar to FIG. 15 but illustrating the clamping mechanism in a clamped position.

FIGS. 19a and 19b are partially cut-away front elevational views similar to FIG. 15, but of a first alternative embodiment of a tool indexer, illustrating internal delivery of coolant to the tool;

FIG. 20 is a partially cut-away front elevational view similar to FIG. 15, but illustrating a second alternative embodiment of a tool indexer and illustrating external delivery of coolant to a tool;

FIG. 21 is a first schematic perspective view of the tool body and clamp housing of the indexer illustrated in FIGS. 19a and 19b.

FIG. 22 is a second schematic perspective view of the tool body and clamp housing of the indexer illustrated in FIGS. 19a and 19b.

FIG. 25 is a partially cut-away front elevational view of an alternative indexer, the indexer including tools that are driven by the turret motor, the indexer being illustrated in an indexing position.

FIG. 26 is a partially cut-away front elevational view of the alternative indexer of FIG. 25, the indexer being illustrated in a driving position.

Terms of orientation, such as "front," "side," and the like, and the description of machine axes, are not intended to be limiting. In practice, it is contemplated that the indexer may be oriented omnidirectionally or positioned to operate in various axes of a computer numerically controlled machine.

DETAILED DESCRIPTION

Any suitable apparatus may be employed in conjunction with the methods of invention. In some embodiments, the methods are performed using a computer numerically controlled machine, illustrated generally in FIGS. 1-9. A computer numerically controlled machine is itself provided in other embodiments of the invention. The machine 100 illustrated in FIGS. 1-9 is an NT-series machine, versions of which are available from Mori Seiki USA, Inc., the assignee of the present application. Other suitable computer numerically controlled machines include the NL-series machines with turret (not shown), also available from Mori Seiki USA, Inc. Other machines may be used in conjunction with the invention, including the NZ, NH, NV, and NMV machines, also available from Mori Seiki USA, Inc.

Figure 1:
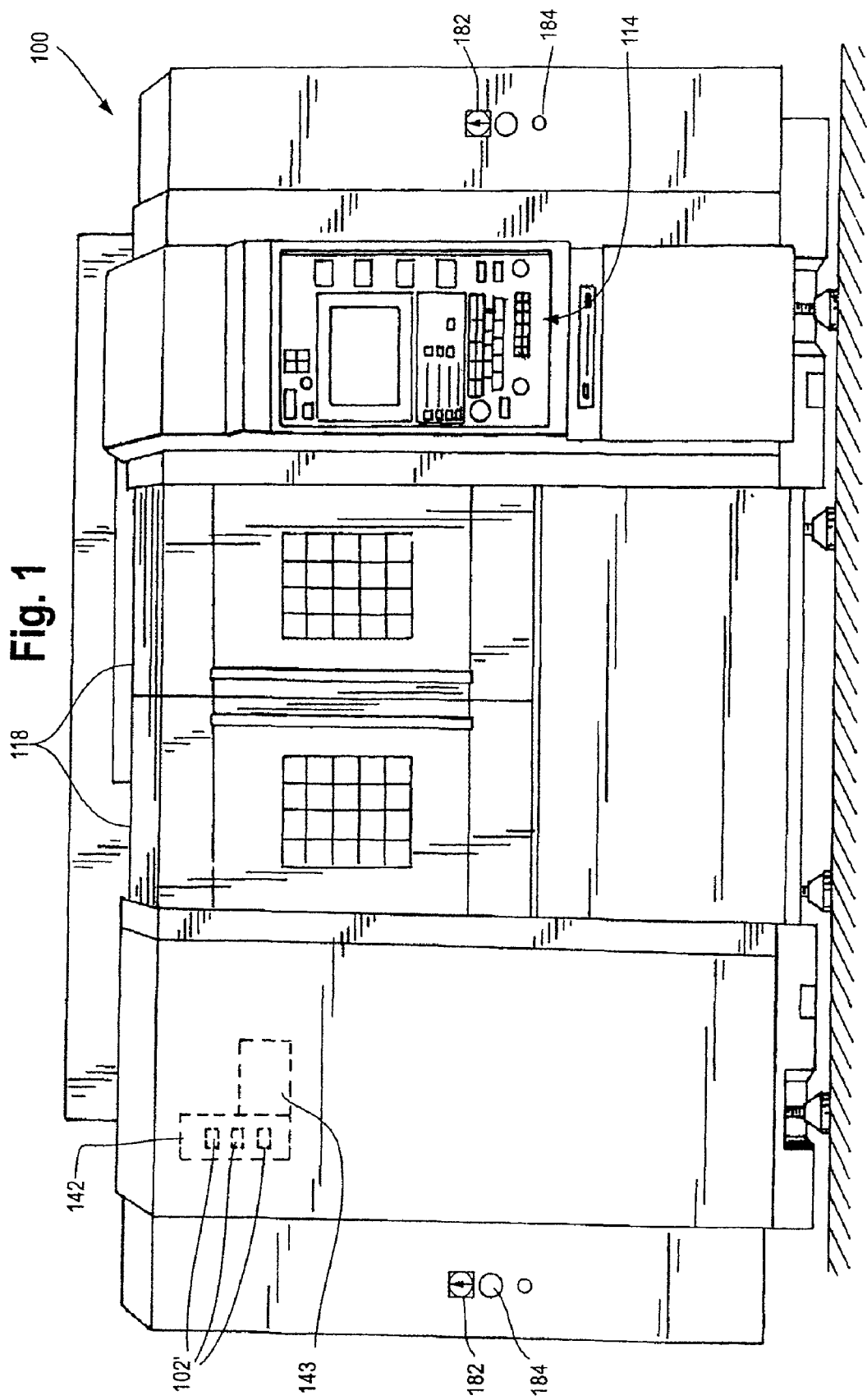
FIG. 1 is a front elevation of a computer numerically controlled machine in accordance with one embodiment of the present invention, shown with safety doors closed.
Figure 2:
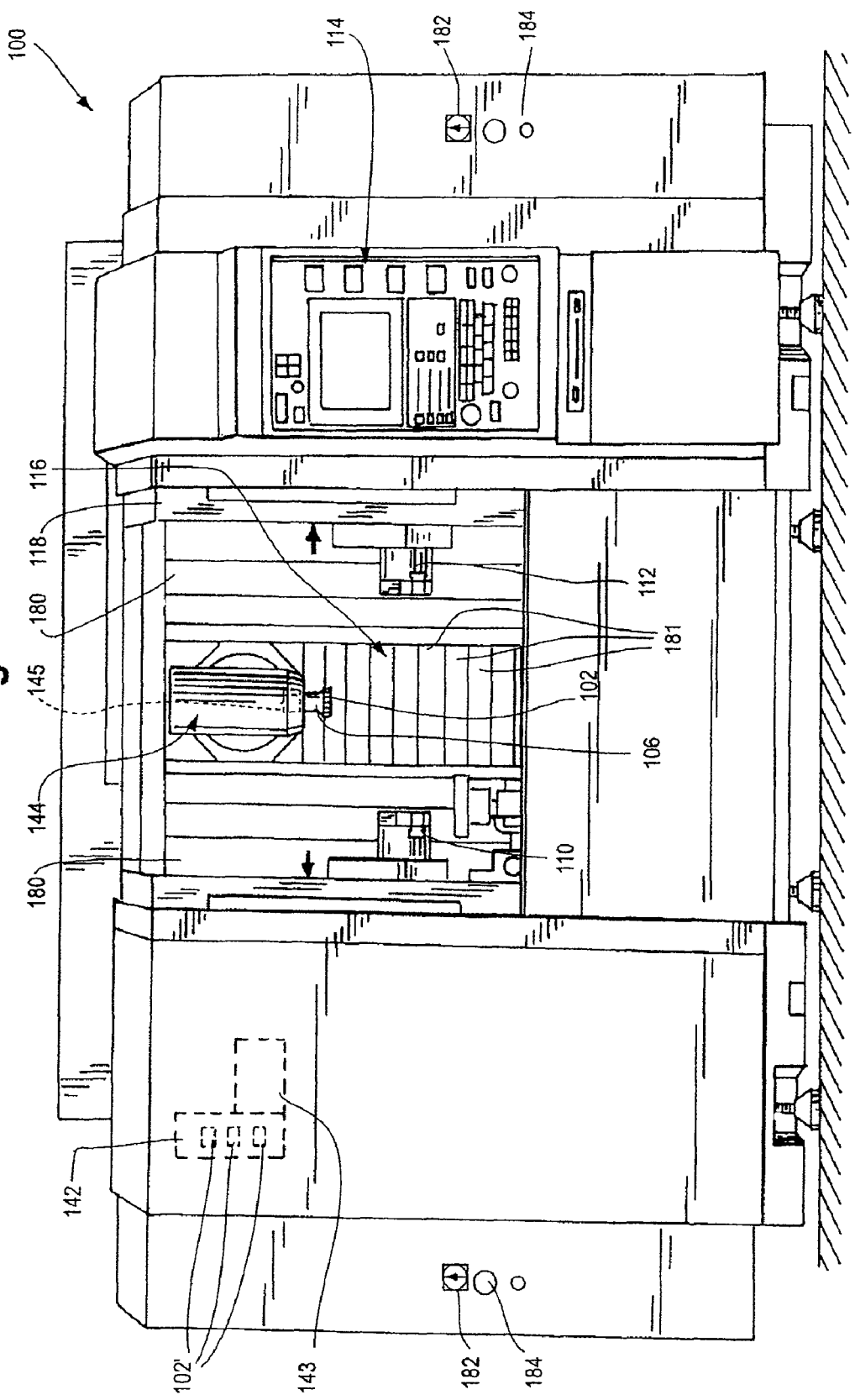
FIG. 2 is a front elevation of a computer numerically controlled machine illustrated in FIG. 1, shown with the safety doors open.
Figure 3:
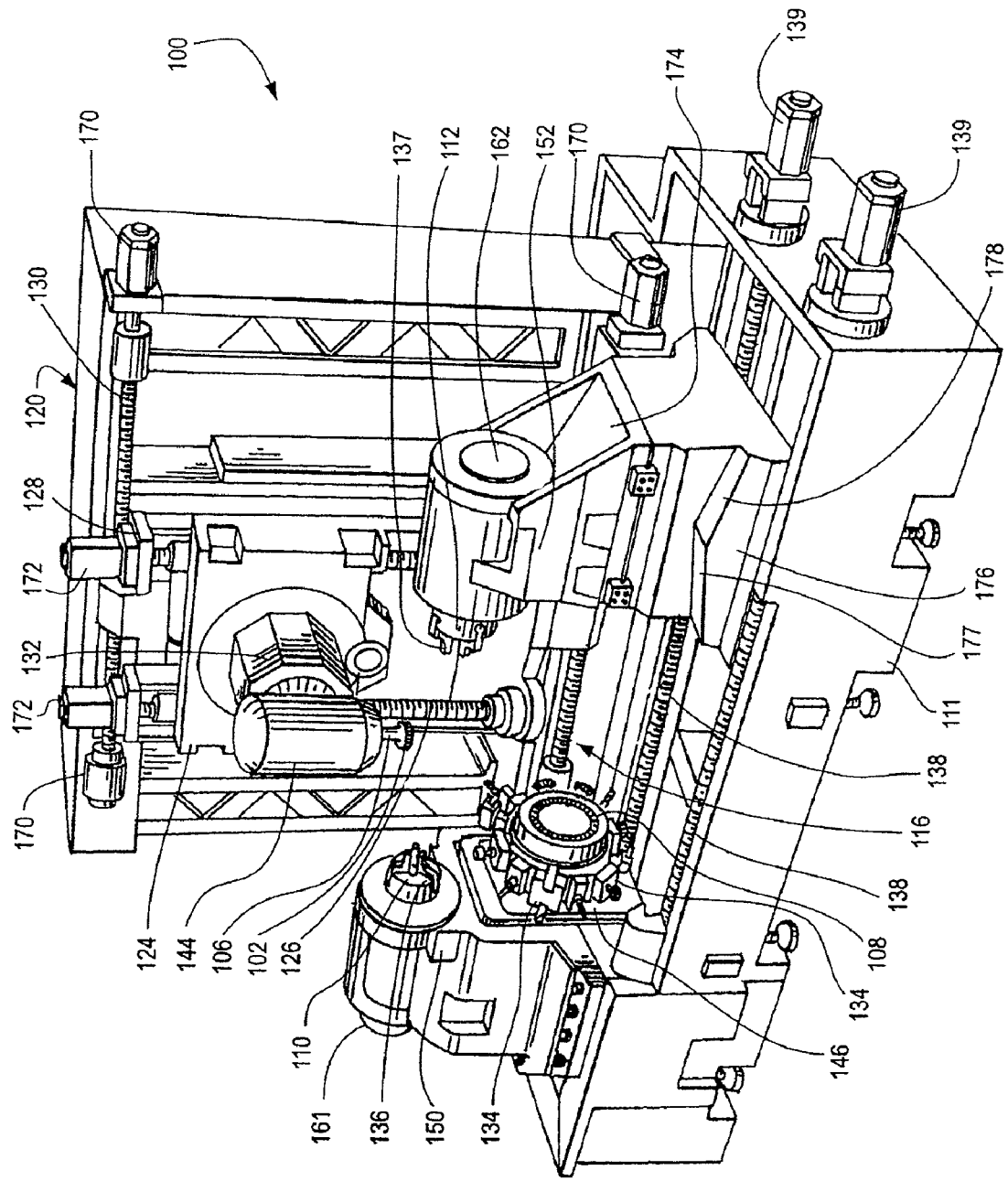
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first retainer and a second retainer, each of which may be one of a spindle retainer associated with spindle 144, a turret retainer associated with a turret 108, or a chuck 110, 112. In the embodiment illustrated in the Figures, the computer numerically controlled machine 100 is provided with a spindle 144, a turret 108, a first chuck 110, and a second chuck 112. The computer numerically controlled machine 100 also has a computer control system operatively coupled to the first retainer and to the second retainer for controlling the retainers, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the chamber 116 to prevent injury to the user or interference in the operation of the computer numerically controlled machine 100. The safety doors 118 can be opened to permit access to the chamber 116 as illustrated in FIG. 2. The computer numerically controlled machine 100 is described herein with respect to three orthogonally oriented linear axes (X, Y, and Z), depicted in FIG. 4 and described in greater detail below. Rotational axes about the X, Y and Z axes are connoted "A," "B," and "C" rotational axes respectively.

The computer numerically controlled machine 100 is provided with a computer control system for controlling the various instrumentalities within the computer numerically controlled machine. In the illustrated embodiment, the machine is provided with two interlinked computer systems, a first computer system comprising a user interface system (shown generally at 114 in FIG. 1) and a second computer system (not illustrated) operatively connected to the first computer system. The second computer system directly controls the operations of the spindle, the turret, and the other instrumentalities of the machine, while the user interface system 114 allows an operator to control the second computer system. Collectively, the machine control system and the user interface system, together with the various mechanisms for control of operations in the machine, may be considered a single computer control system. In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically computer controlled machine 100 may have a tool magazine 142 and a tool changing device 143. These cooperate with the spindle 144 to permit the spindle to operate with plural cutting tools (shown in FIG. 1 as tools 102'). Generally, a variety of cutting tools may be provided; in some embodiments, plural tools of the same type may be provided.

The spindle 144 is mounted on a carriage assembly 120 that allows for translational movement along the X- and Z-axes, and on a ram 132 that allows the spindle 144 to be moved in the Y-axis. The ram 132 is equipped with a motor to allow rotation of the spindle in the B-axis, as set forth in more detail hereinbelow. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the cutting tool 102 by way of a spindle connection and a tool holder 106. The spindle connection 145 (shown in FIG. 2) is connected to the spindle 144 and is contained within the spindle 144. The tool holder 106 is connected to the spindle connection 145 and holds the cutting tool 102. Various types of spindle connections are known in the art and can be used with the computer numerically controlled machine 100. Typically, the spindle connection 145 is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 100. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
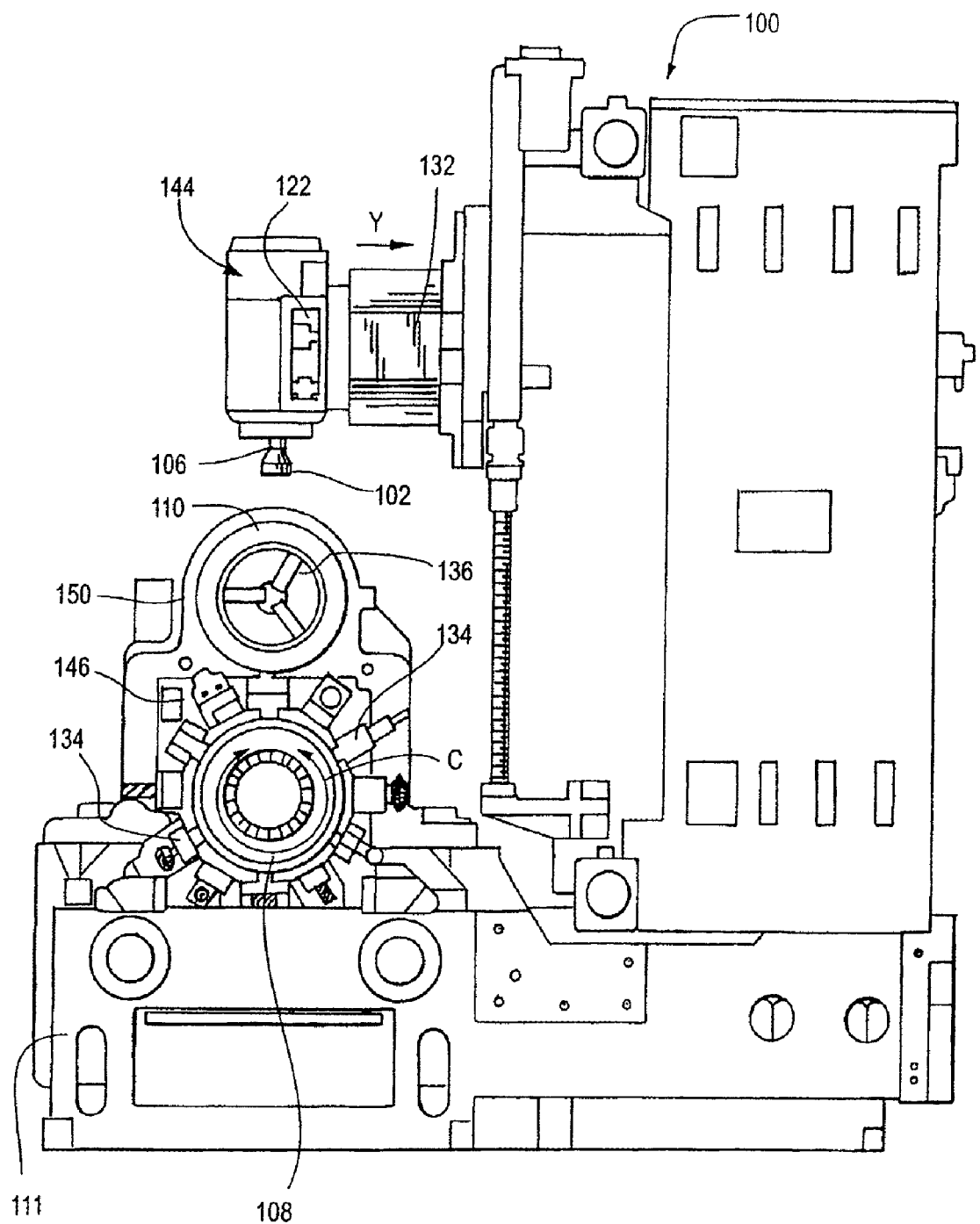
FIG. 5 is a side view of the first chuck, machining spindle, and turret of the computer numerically controlled machine illustrated in FIG. 1.
Figure 6:
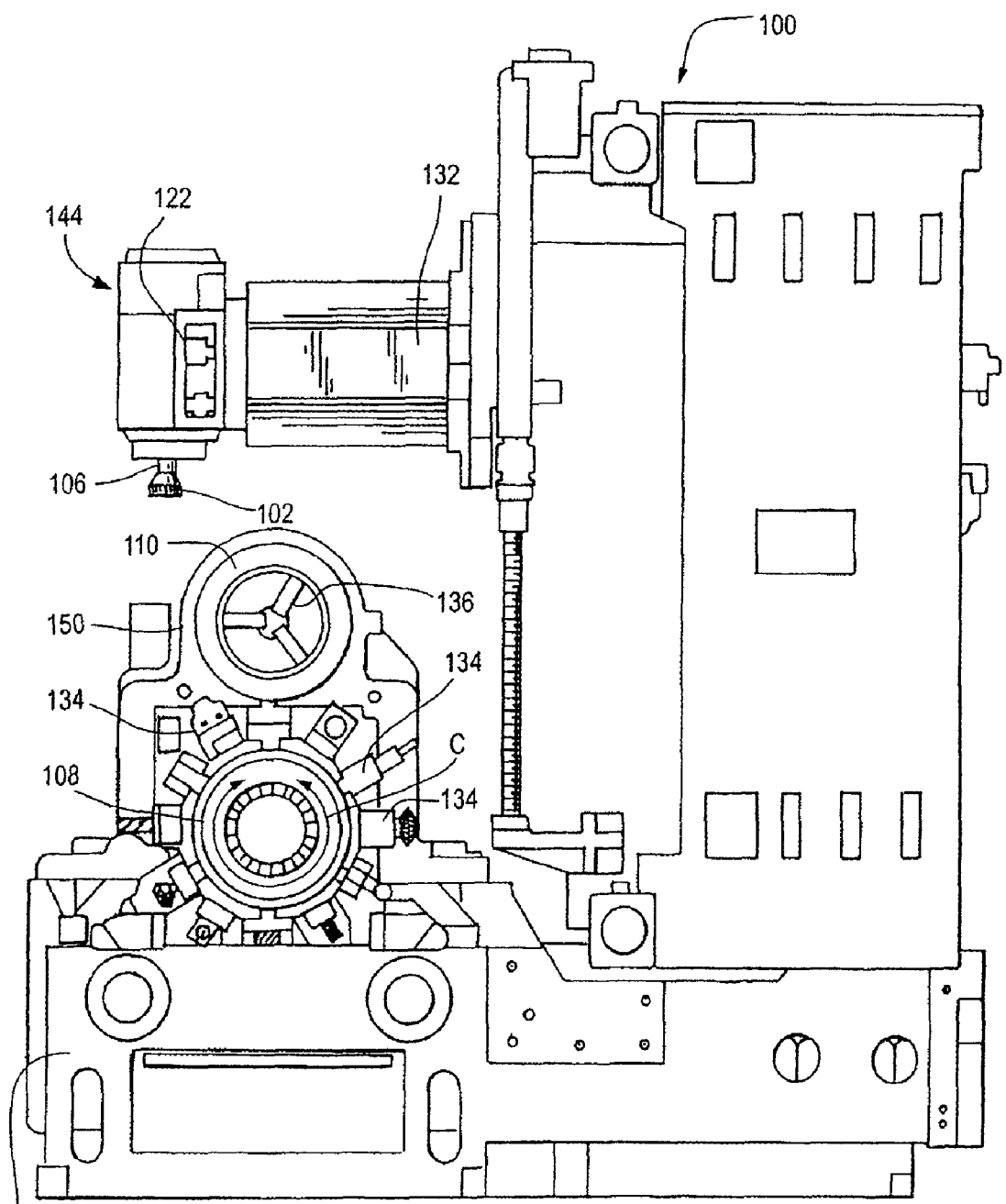
FIG. 6 is a view similar to FIG. 5 but in which a machining spindle has been translated in the Y-axis.
Figure 9:
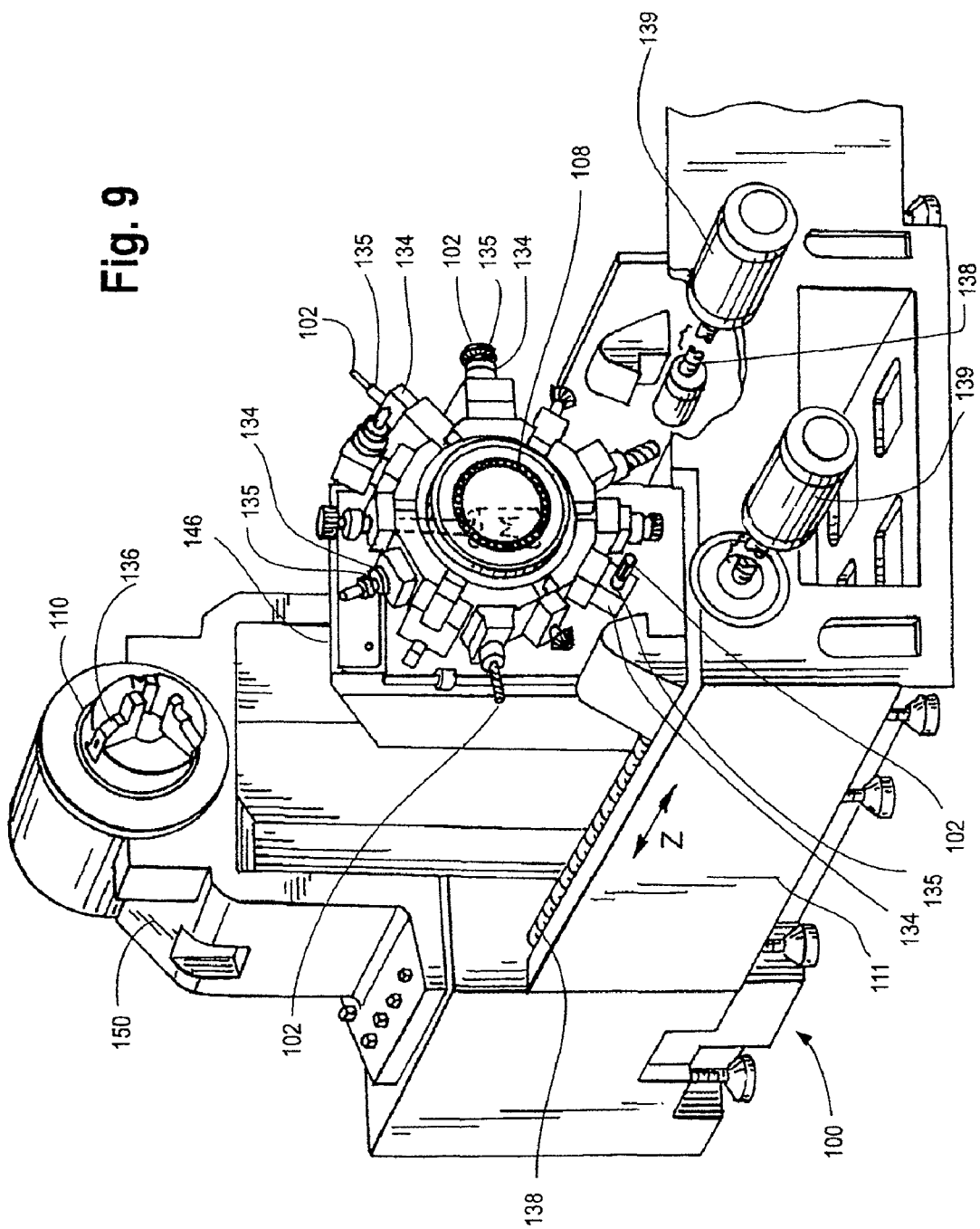
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 (FIG. 5) that also engages rails 138 and that may be translated in a Z-direction, again via ball-screw devices. The turret 108 is provided with various turret connectors 134, as illustrated in FIG. 9. Each turret connector 134 can be connected to a tool holder 135 or other connection for connecting to a cutting tool. Since the turret 108 can have a variety of turret connectors 134 and tool holders 135, a variety of different cutting tools can be held and operated by the turret 108. The turret 108 may be rotated in a C axis to present different ones of the tool holders (and hence, in many embodiments, different tools) to a workpiece.

Figure 4:
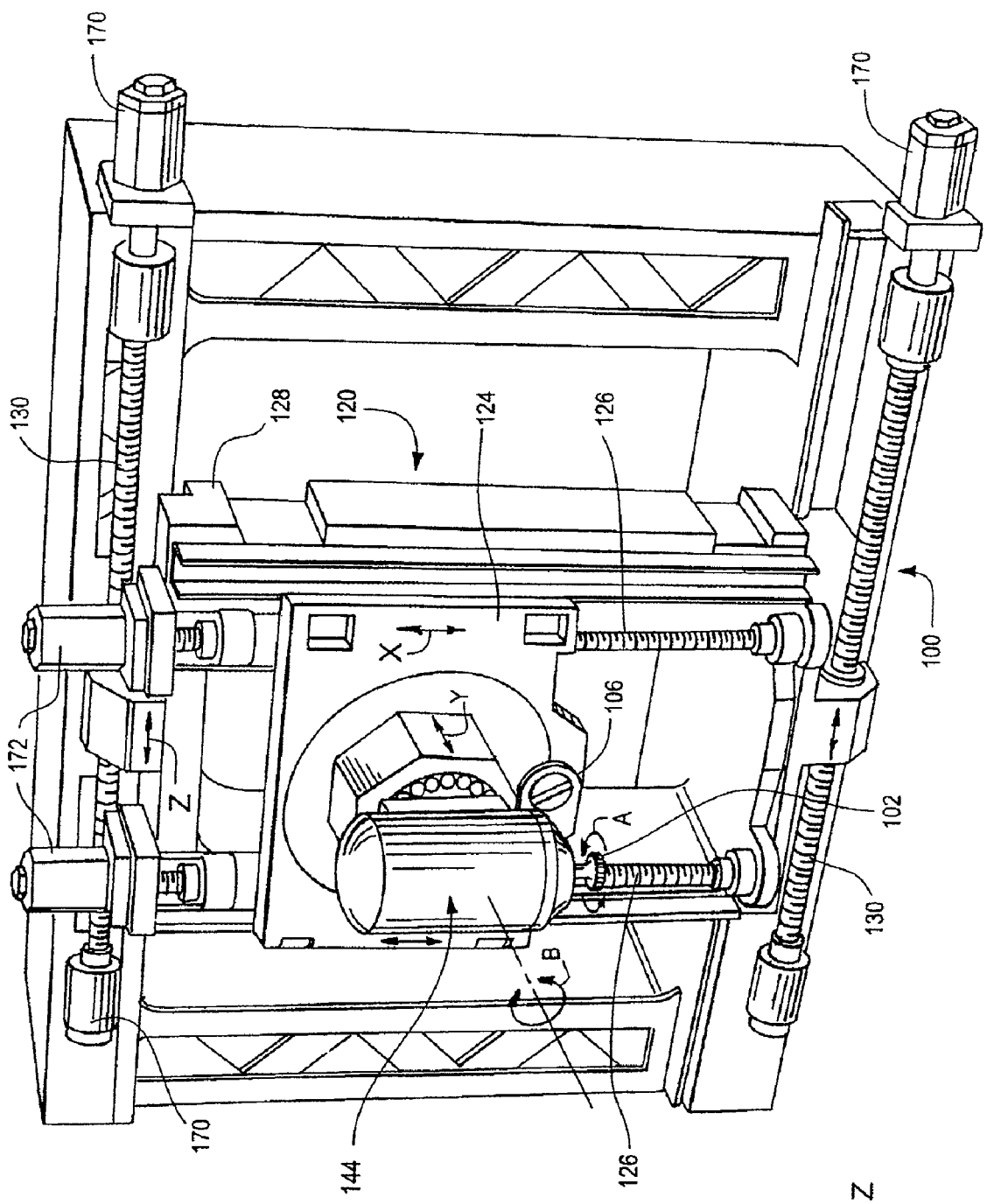
FIG. 4 is a perspective view, enlarged with respect to FIG. 3, illustrating the machining spindle and the horizontally and vertically disposed rails via which the spindle may be translated.
Figure 7:
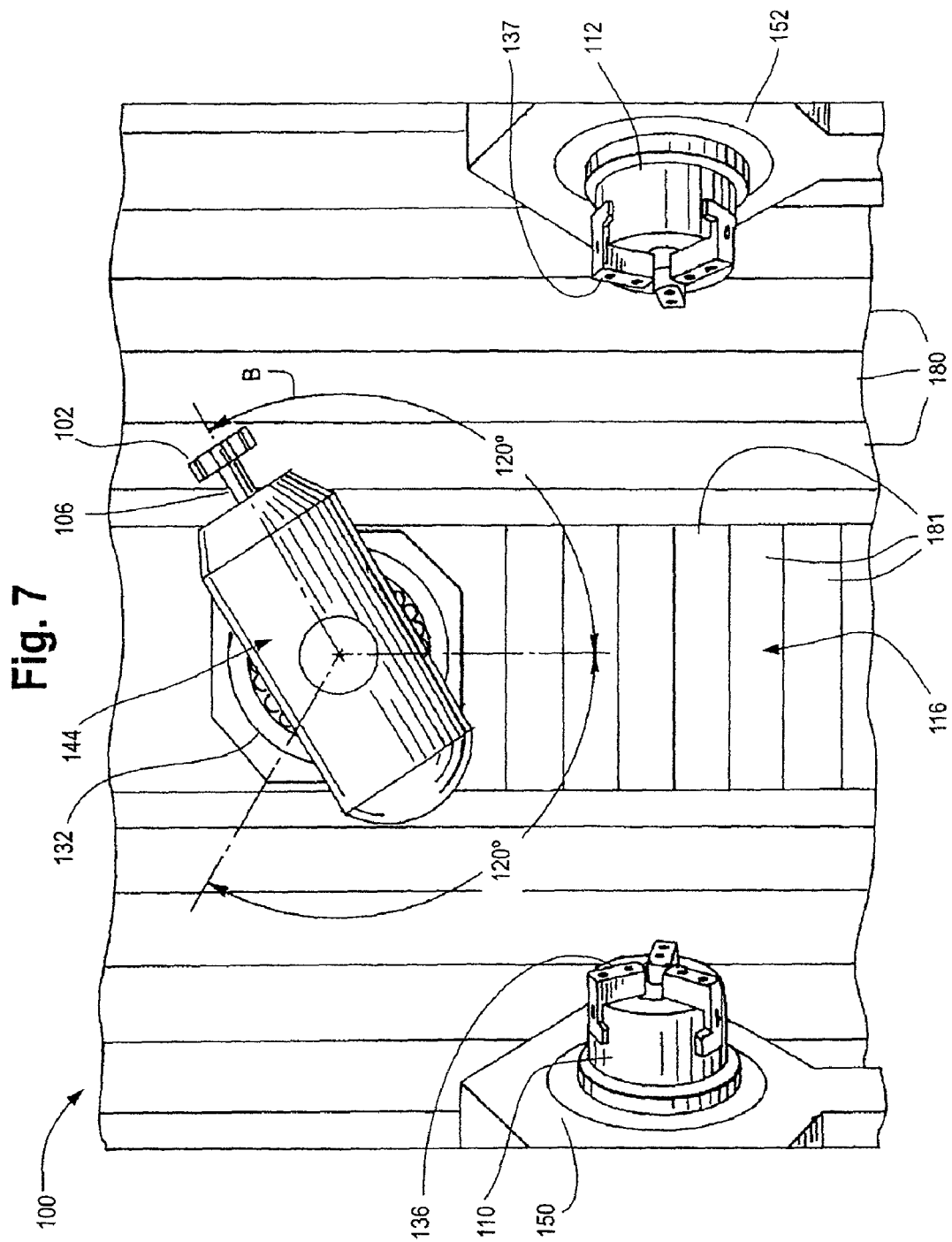
FIG. 7 is a front view of the spindle, first chuck, and second chuck of the computer numerically controlled machine illustrated in FIG. 1, including a line depicting the permitted path of rotational movement of this spindle.
Figure 8:
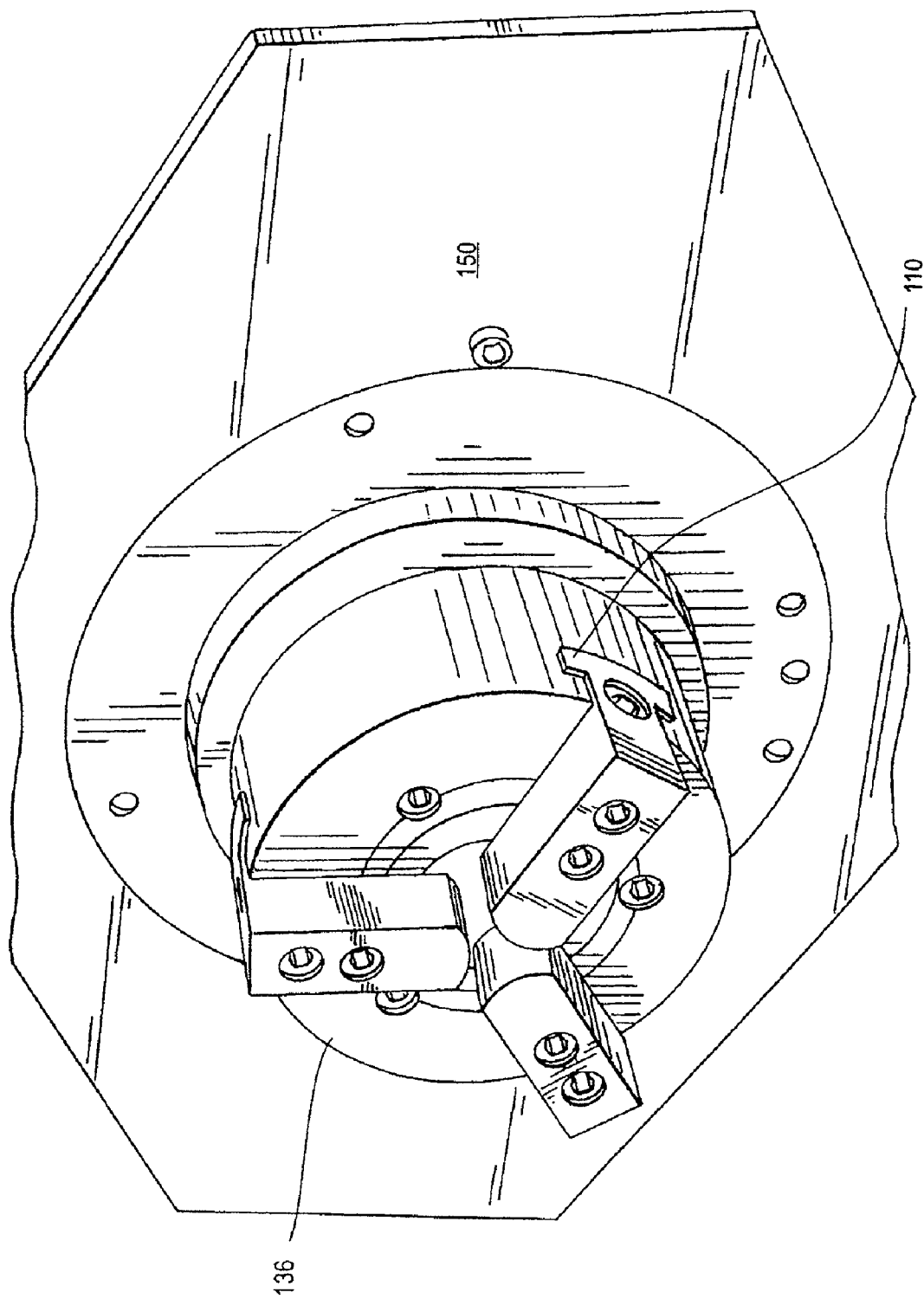
FIG. 8 is a perspective view of the first chuck illustrated in FIG. 3, enlarged with respect to FIG. 3.

It is thus seen that a wide range of versatile operations may be performed. With reference to tool 102 held in tool holder 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changing device 143. With reference to FIGS. 4 and 5, the spindle 144 may be translated in the X and Z directions (shown in FIG. 4) and Y direction (shown in FIGS. 5 and 6). Rotation in the B axis is depicted in FIG. 7, the illustrated embodiment permitting rotation within a range of 120° to either side of the vertical. Movement in the Y direction and rotation in the B axis are powered by motors (not shown) that are located behind the carriage 124. Generally, as seen in FIGS. 2 and 7, the machine is provided with a plurality of vertically disposed leaves 180 and horizontal disposed leaves 181 to define a wall of the chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the chamber 116.

In the illustrated embodiment, the computer numerically controlled machine 100 is provided with numerous retainers. Chuck 110 in combination with jaws 136 forms a retainer, as does chuck 112 in combination with jaws 137. In many instances these retainers will also be used to hold a workpiece. For instance, the chucks and associated stocks will function in a lathe-like manner as the headstock and optional tailstock for a rotating workpiece. Spindle 144 and spindle connection 145 form another retainer. Similarly, the turret 108, when equipped with plural turret connectors 134, provides a plurality of retainers (shown in FIG. 9).

The computer numerically controlled machine 100 may use any of a number of different types of cutting tools known in the art or otherwise found to be suitable. For instance, the cutting tool 102 may be a milling tool, a drilling tool, a grinding tool, a blade tool, a broaching tool, a turning tool, or any other type of cutting tool deemed appropriate in connection with a computer numerically controlled machine 100. As discussed above, the computer numerically controlled machine 100 may be provided with more than one type of cutting tool, and via the mechanisms of the tool changing device 143 and magazine 142, the spindle 144 may be caused to exchange one tool for another. Similarly, the turret 108 may be provided with one or more cutting tools 102, and the operator may switch between cutting tools 102 by causing rotation of the turret 108 to bring a new turret connector 134 into the appropriate position.

Other features of a computer numerically controlled machine include, for instance, an air blower for clearance and removal of chips, various cameras, tool calibrating devices, probes, probe receivers, and lighting features. The computer numerically controlled machine illustrated in FIGS. 1-9 is not the only machine of the invention, but to the contrary, other embodiments are envisioned.

Figure 10:
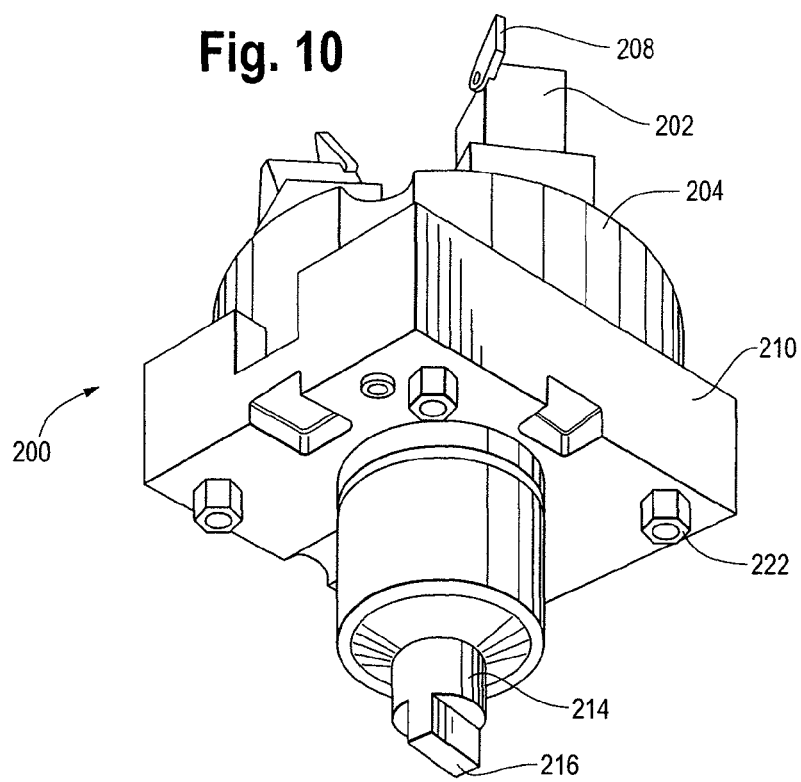
FIG. 10 is a perspective view of a tool indexer useful in connection with one embodiment of the invention, including three tools mounted thereon.

With reference now to FIG. 10, the indexer 200 includes a table 204 (better shown in FIGS. 11 and 12) that is provided with a plurality of tool stations 203. Three tools stations 203 are shown in the illustrated embodiment, but a greater or smaller number of tool stations 203 may be provided. In some embodiments, to avoid tool interference a number of tool stations that does not provide tools at a 180° offset from one another is desired; this being an odd number (3, 5, or 7 tool stations) in many embodiments. The tool stations 203 are configured to receive a tool structure, which may be a tool, a tool linkage or holder, or another intermediate structure between the tool and table. In practice, the tool station may be used to retain other instrumentalities such as coolant nozzles, gauges and the like, and hence the term "tool station" should not be construed as being limited to the requirement of a tool. In the illustrated embodiment, tool linkages 206 connect the table 204 to the tools 202. The tools 202 are provided with inserts 208 which are intended to engage a workpiece to cause removal of material therefrom.

A variety of tools and tool linkages are contemplated. In the illustrated embodiment, three identical tools are shown. It is possible, however, for two or three different types of tools to be provided on the table, or for the table to retain one or more gauges or the like in addition to one or more tools. Likewise, in the illustrated embodiment, as shown the tools are bolted to the linkages and to the table, but in some embodiments a "quick-change" tool setup such as a CAPTO, HSK, or KM setup may be employed.

Figure 11:
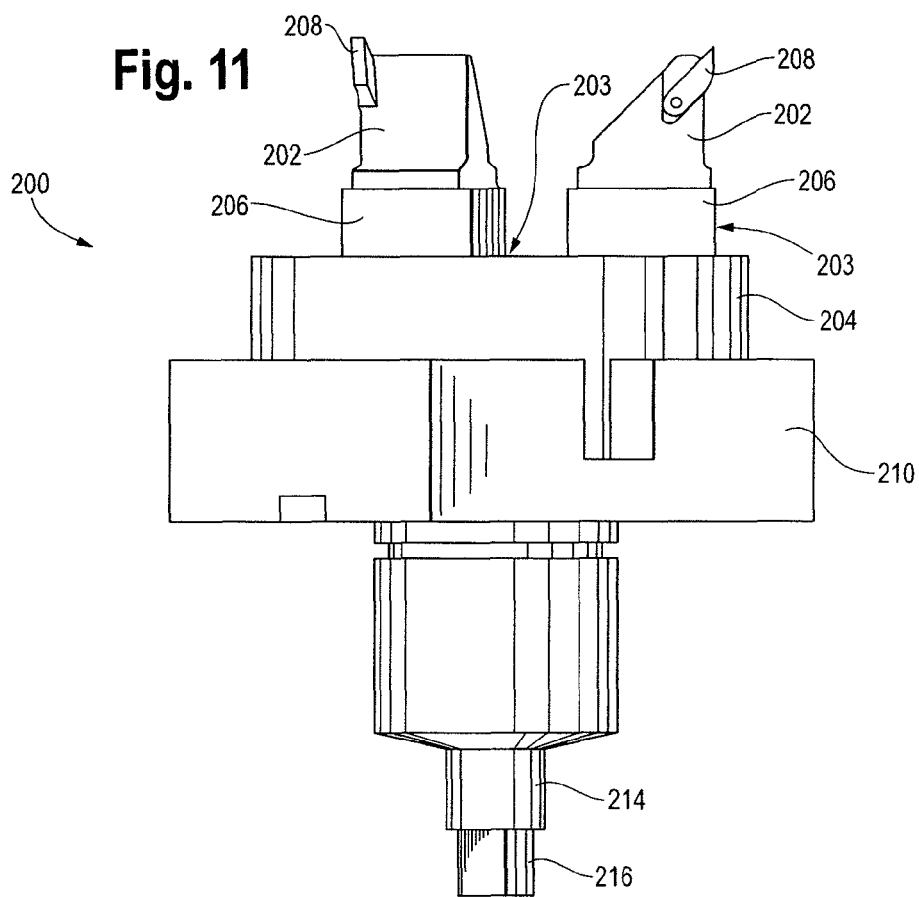
FIG. 11 is a front elevational view of the indexer illustrated in FIG. 10.
Figure 12:
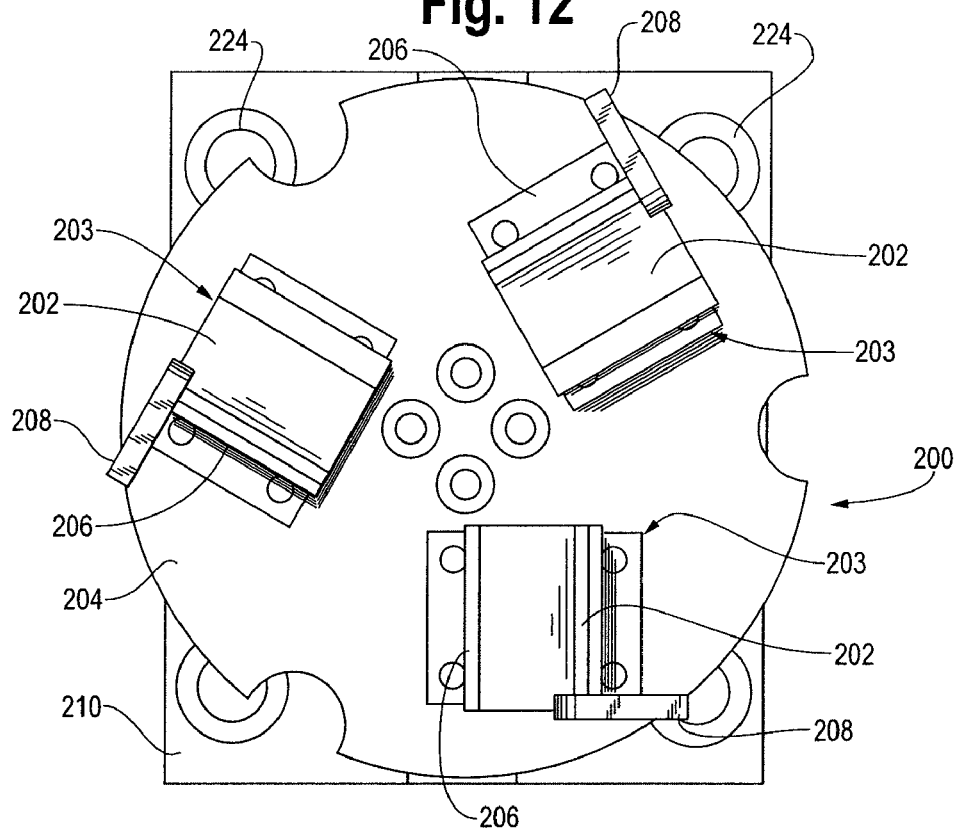
FIG. 12 is a top plan view of the indexer illustrated in FIG. 10.
Figure 13:
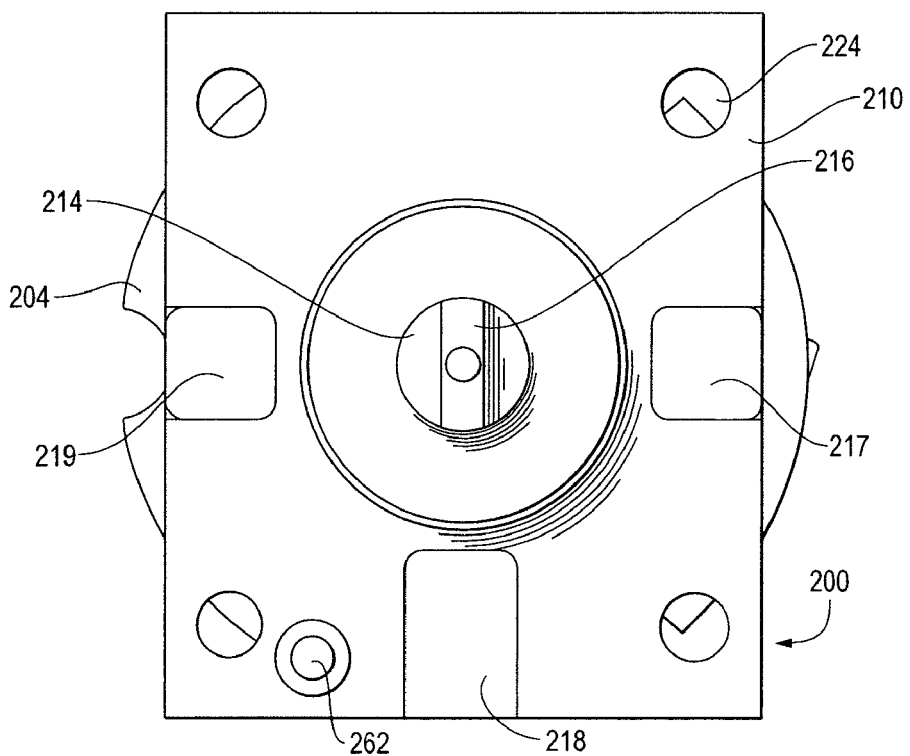
FIG. 13 is a bottom plan view of the indexer illustrated in FIG. 10.
Figure 17:
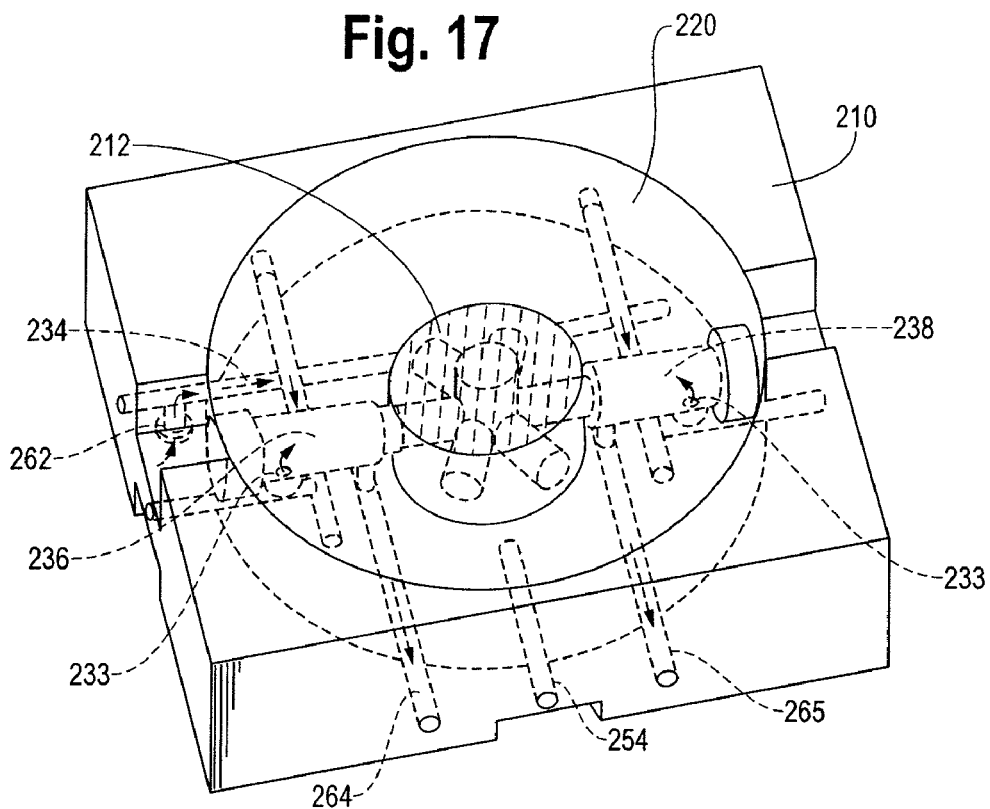
FIG. 17 is a first schematic perspective view of the tool body and clamp housing of the indexer illustrated in FIG. 10.
Figure 18:
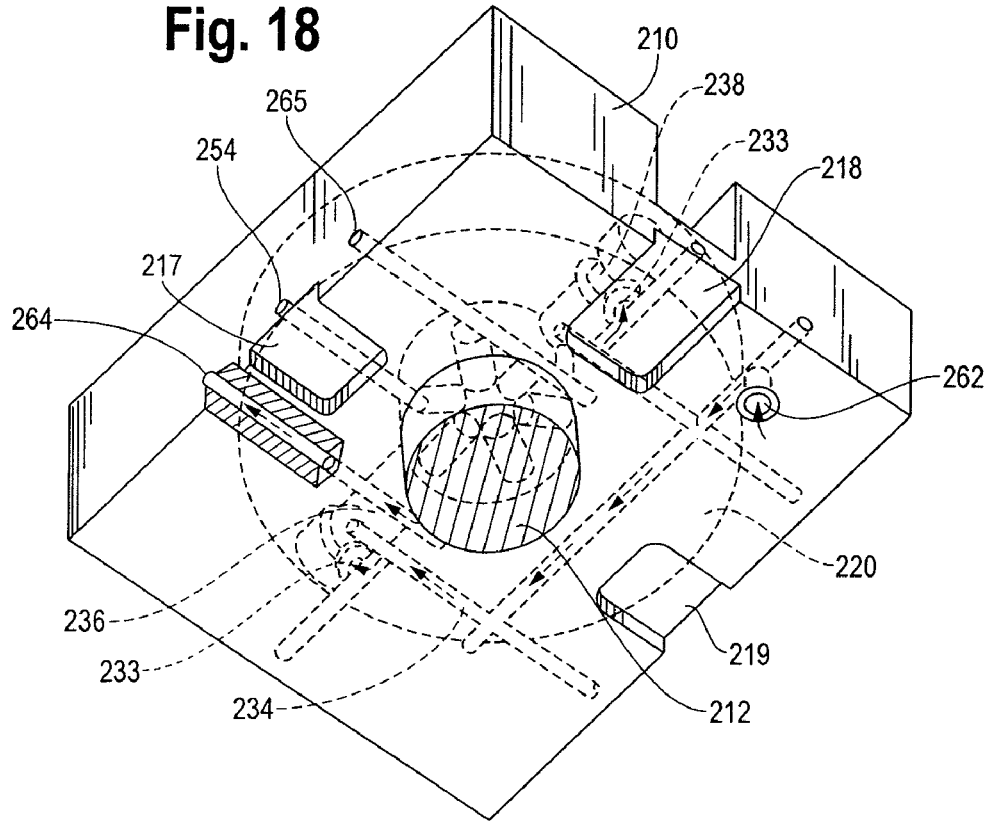
FIG. 18 is a second schematic perspective view of the tool body and clamp housing of the indexer illustrated in FIG. 10.

The indexer 200 also is provided with a housing in the form of tool body 210. The indexer also is provided with an arbor 212, and a key 214, the arbor and key being better shown in FIGS. 10, 11, and 13. With reference to FIG. 11, the key 214 is configured at its distal end 216 to fit within a suitable slot within the turret 108 (not illustrated in FIG. 14) for causing indexed rotation of the key. The turret 108 may be equipped with a motor that is under computer control. In some embodiments, the turret 108 may be equipped with a belt-driven motor, but in preferred embodiments the key 214 may be coupled to and driven directly by a motor that is disposed within the turret 108. Exemplary turrets are disclosed in U.S. Pat. Nos. 7,150,085 and 7,137,180. The indexer in the illustrated embodiment is mounted to a turret. Keyways 217, 218, 219 (shown in FIG. 13) engage corresponding keys (not shown) on the facet of the turret to ensure that the indexer is oriented correctly on the turret.

In the illustrated embodiment, the key 214 is bolted to the arbor 212, and the arbor 212 is bolted to the table 204. When so assembled, the table, arbor, and key operate as a single integral movable portion. The body 210 is affixed to the turret 108 via bolts 222 (FIG. 10) which pass through bolt holes 224. The indexer 200 also has a clamp housing 220 affixed to the body 210. The clamp housing 220 is provided for purposes of providing clamping, as will be hereinafter described. In the illustrated embodiment, as heretofore described, the tool linkages 206 are bolted to the table 204, and the tools 202 are bolted to the tool linkages 206, as shown in FIG. 14. A Belleville washer 226 is provided to separate the body 210 from the turret 108 and to tension the body 210 with respect to the turret 108. In practice, needle bearings (not shown) may be disposed between the body 210 and washer 226, and between the tool stations 203 and clamp housing 220.

It is thus seen that, upon rotation of key 214, the arbor 212 and table 204 will rotate as an integral unit, while the clamp housing 220 and body 210 will remain stationary with respect to the turret. With reference to FIGS. 14 and 15, the arbor 212 is connected to the key 214 via a threaded connection in which threads 228 in the key 214 are received in a threaded socket 230 in the arbor 212. The key may be, and preferably is, driven by the turret motor, but in other embodiments it is contemplated that a separate driving mechanism could be provided. The table 204 could be rotated rapidly during a material removal operation, but generally it is contemplated that the turret motor will be used for indexed rotation of the table. The turret motor could rotate in either direction for this purpose. In the existing Mori Seiki NT-series machines, no modification is needed to the machine or computer control system to enable the turret motor to index the table and tools under computer control.

Optionally, but preferably, a clamping mechanism is provided. Clamping may be accomplished via the clamp housing 220 and associated components as illustrated, or via any other suitable clamping mechanism, such as a separately actuated hydraulic mechanism or a mechanical clamping mechanism. In some embodiments clamping is effectuated with electrical current. In the clamp housing 220 illustrated in FIGS. 14-16, the arbor 212 is equipped with one or more piston sockets 232 (also seen in FIG. 14). A fluid, which may be same fluid used to apply coolant within the machine or a different fluid, is introduced to the clamp housing 220 via a coolant conduit 234. The clamp housing 220 includes clamping pistons 240, 242 disposed within piston cylinders 236, 238, with antechambers 244, 246 positioned radially outwardly of the pistons 240, 242. The antechambers 244, 246 are in communication with the coolant conduit 234, via inlet ports 233 which allow flow of coolant from the conduit 234 into the antechambers 244, 246. The coolant conduit 234 branches through the housing 210 and the clamp housing 220 to deliver fluid to the piston cylinders 236, 238. In the illustrated embodiment, the coolant path terminates in several places in plugged holes and blind holes, which were created via a drilling process used to create the various branches of the conduit 234 but which serve no independent function in the tool body.

When coolant is introduced from a coolant source, the coolant will pressurize the antechambers 244, 246 of the piston cylinders 236, 238 and will assert an inwardly biasing force on the clamping pistons 240, 242. As shown in FIG. 16, this will cause the clamping pistons 240, 242 to engage the arbor 212 in opposing pairs of piston sockets 232 which, when indexed, become extensions of the piston cylinders 236, 238. The arbor 212 thus will be firmly retained by the pistons to thereby inhibit vibration and undesired movement of the table 204. In other embodiments, a gearing or cam arrangement may be employed for clamping, or the clamps may be applied to the turret or underlying structure. For instance, the turret motor itself, along with a reducing gearing arrangement in an indexer similar to that of FIG. 25, may provide clamping through resistance of the turret motor. In other embodiments, a hydraulic clamping mechanism may be provided but wherein another clamping element or other clamping elements, such as a collet or diaphragm or multiple such elements, may be hydraulically actuated.

The illustrated arbor has six sockets 232, and it is contemplated that this will enable clamping in any one of six indexed positions (each at a 60 degree offset with respect to the next position). It is contemplated that the arbor may include a greater or smaller number of sockets, and it is likewise contemplated that a geared or other clamping arrangement may be provided. In some geared arrangements, it is contemplated that a clamping may be employed in a greater number of indexed positions. In other clamping arrangements, it is envisioned that the indexer may be freely rotated or translated and clamped in any position.

The clamping pistons 240, 242 are provided with springs 248 to urge the pistons 240, 242 in an outward direction as shown in FIG. 15. The springs 248 cause movement of the pistons 240, 242 in the outward direction to thus release the clamp when the pressure of the fluid in the antechambers 244, 246 has been released. Limiters in the form of limiting screws 250 are provided to limit the radial travel of the pistons.

Generally, it will be desired that the fluid that is used to hydraulically actuate the pistons remain sealed within the antechambers and preceding conduits. To this end, O-ring seals 252 are provided on the pistons 240, 242. To account for imperfect sealing of the pistons, a coolant drain 254 is provided to drain the area surrounding the arbor 212, which in turn is sealed with an internal O-ring 256 and a secondary internal O-ring 258. The secondary internal O-ring 258 sits within a groove 259 in the arbor 212 (seen in FIG. 14). An external O-ring 260 is provided to seal the space between the arbor 212 and the structures on the turret 108. As better illustrated in FIGS. 13 and 15-18, coolant enters the housing 210 though inlet port 262 and is distributed through the coolant conduit 234 to the piston cylinders 236, 238. Additional coolant drains 264, 265 are provided for drainage of excess coolant that may escape the O-ring seals 252 into the area of the piston cylinders 236, 238 proximal the arbor 212.

With respect to FIGS. 19a and 19b, and the alternative embodiment described therein, in many respects the configuration of the illustrated indexer 200' is similar to that previously described, except that, in this embodiment, the fluid that is used to hydraulically actuate the machine also is introduced as coolant during a material removal operation. As shown, the pistons 240', 242' are actuated by coolant introduced via coolant conduit 234'. Upon actuation (as shown in FIG. 19b), the pistons 240', 242' are caused to move radially inwardly to engage the piston sockets 232' of the arbor 212' for clamping. Each piston 240', 242' serves as a valve that interrupts fluidic communication between the antechambers 244', 246' and a coolant supply conduit 235' for allowing introduction of coolant to the machine. Coolant generally cannot fluidically communicate with the conduit 235' when the pistons 240', 242' are not in a clamping position, as the pistons 240', 242' block outlet ports 237' connecting the piston cylinders 236', 238' to the coolant supply conduit 235'. In the illustrated embodiment, the coolant is provided internally to the table 204' and is delivered proximal the tool 202' internally through the conduit 235' . In this embodiment, drains 264', 265' are provided to accommodate coolant that leaks past O-ring seals 252', and drain 254' is provided to drain the area surrounding the arbor 212'. Appropriate seals, such as elastomeric lip seals (not shown) may be provided. As seen in FIGS. 21 and 22, the configuration of the coolant conduits 234', and drains 254', 264', 265' in the housing is similar to that heretofore described, except that the body 210' includes coolant supply conduit 235'.

With regard to FIG. 20, the configuration of the depicted indexer 200" is essentially identical to the indexer 200' of FIGS. 19a and 19b, except that, in this embodiment, when coolant is introduced into conduit 234" it exits the indexer 200" via a nozzle 235" that is external to the table 204". This embodiment is preferred in cases where the operator desires to change frequently between operations where coolant is applied and where coolant is not applied. The operator may manually block the nozzle 235" to impede coolant flow into the machine when desired. In some embodiments, however, it is believed that the internally delivered embodiment of FIGS. 19a and 19b can deliver coolant with more accuracy.

As an alternative, it is contemplated that an internal valve, either manually actuated or actuated under computer control, alternatively may be provided to control coolant flow.

Figure 23:
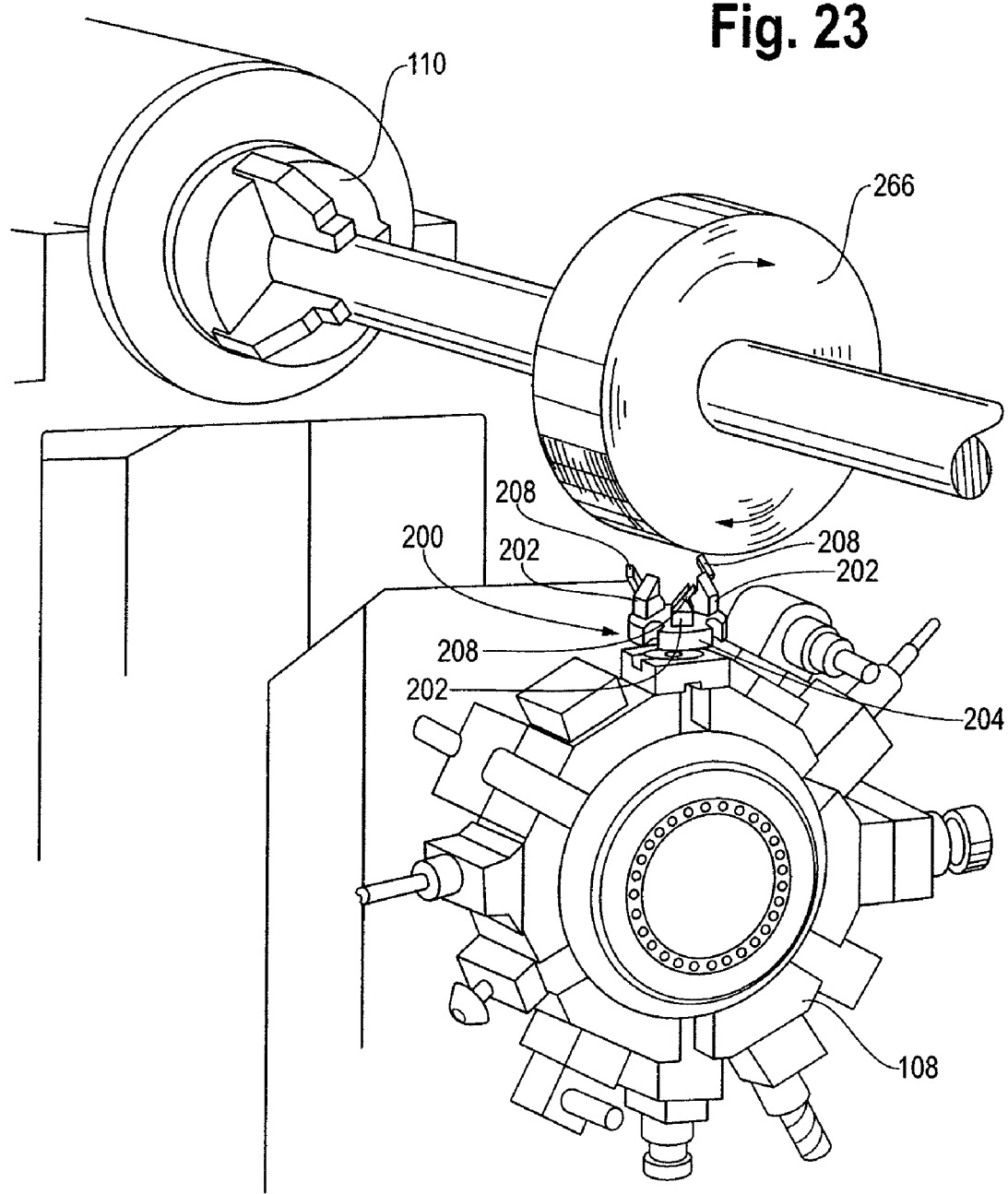
FIG. 23 is a perspective view of a turret-indexer assembly incorporating the indexer illustrated in FIG. 10, the assembly shown in use in a turning operating.

As illustrated in FIG. 23, in operation, the turret-indexer assembly 200 is used to allow the three tools to be brought into position to engage a workpiece 266 that is disposed in the chuck 110 of the main spindle of the NT-Series depicted in FIGS. 1 through 9. The turret 108 is provided with an internally driven motor that is under the digital computer control of the computer control system of the computer numerically controlled machine 100. Instead of being employed to rotate a milling or other rapidly turning tool, however, the motor is employed for indexing movement of the table 204 to selectively bring one of the tools 202 into an operating position with respect to the workpiece 266. The table is moved to move a first one of the tools into an indexed working position relative to a workpiece holder, and the tool is used to engage a workpiece via relative motion of the workpiece holder and tool. The tool is then used to remove material from a workpiece disposed in the holder. In some embodiments, a second tool and optionally subsequently a third tool on the indexer may be brought into engagement with the same workpiece, and in these and other embodiments the tool may be used to remove material from one or more additional workpieces.

Figure 24:
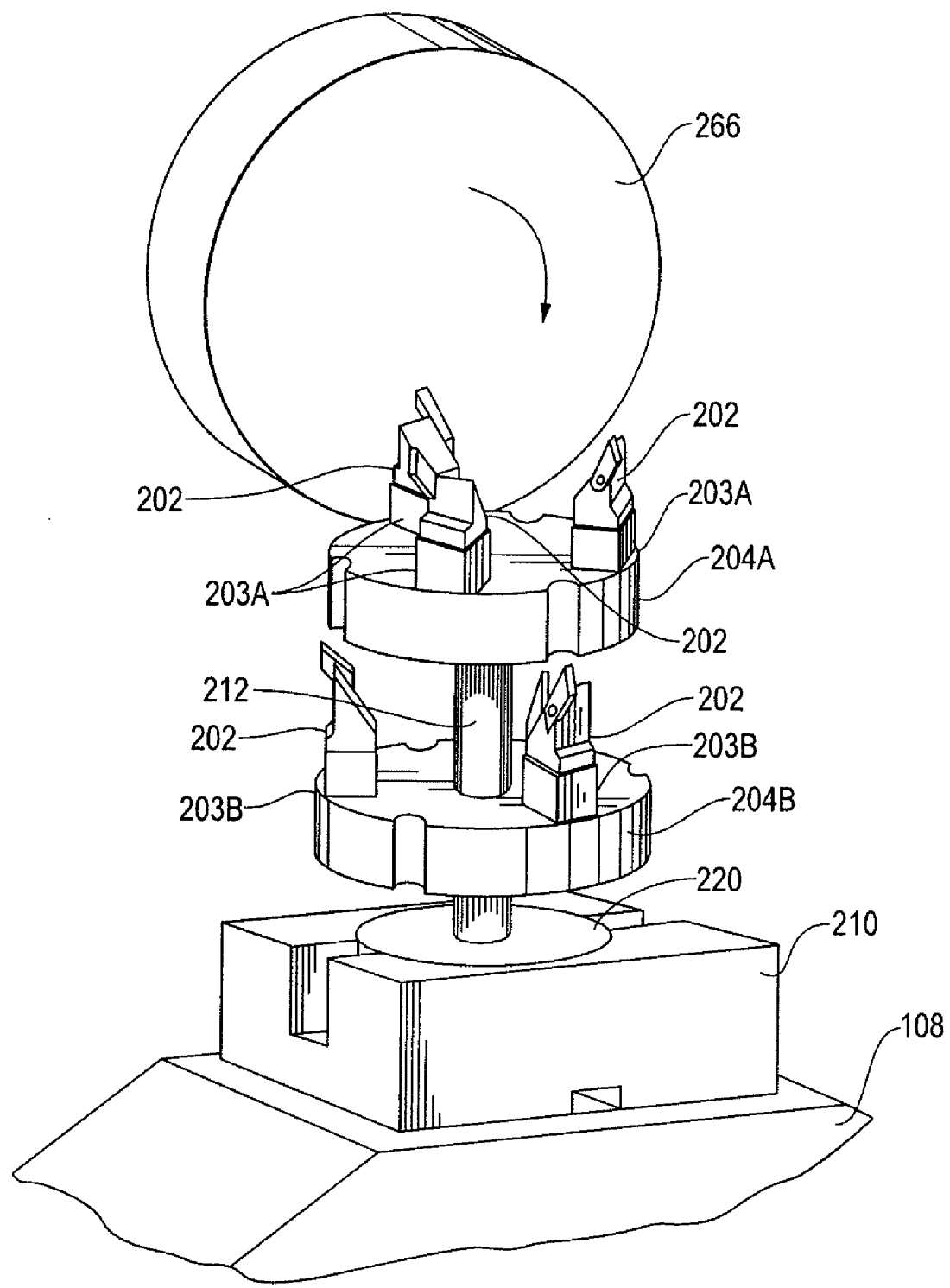
FIG. 24 is a perspective view of a third alternative embodiment of a tool indexer illustrating Y-axis stacking of tools.

In the illustrated embodiment, the table 204 rotates about an axis that is generally orthogonal to the axis of rotation of the turret 108, although in other embodiments, this is not necessary. The illustrated arrangement is deemed suitable for a variety of operations including in particular OD turning operations. It is envisioned that an alternative table arrangement may be provided wherein, instead of rotating the table 204 while indexing, the indexing may be accomplished via translation. Alternatively or additionally, as shown in FIG. 24, multiple tables 204A, 204B, each having at least one and preferable multiple tool stations 203A, 203B may be provided in a stacked arrangement.

The heretofore described embodiments depict tools that are stationary when in operation, but in some embodiments the tools may be themselves driven, and the apparatus may be configured for driving of a tool disposed in at least one of the tool stations. For instance, the tool linkages or holders may be provided with independent motors. Alternatively, via a gearing arrangement, the turret motor may be disengaged from the arbor for indexing and may be operatively engaged with the tool.

Figure 27:
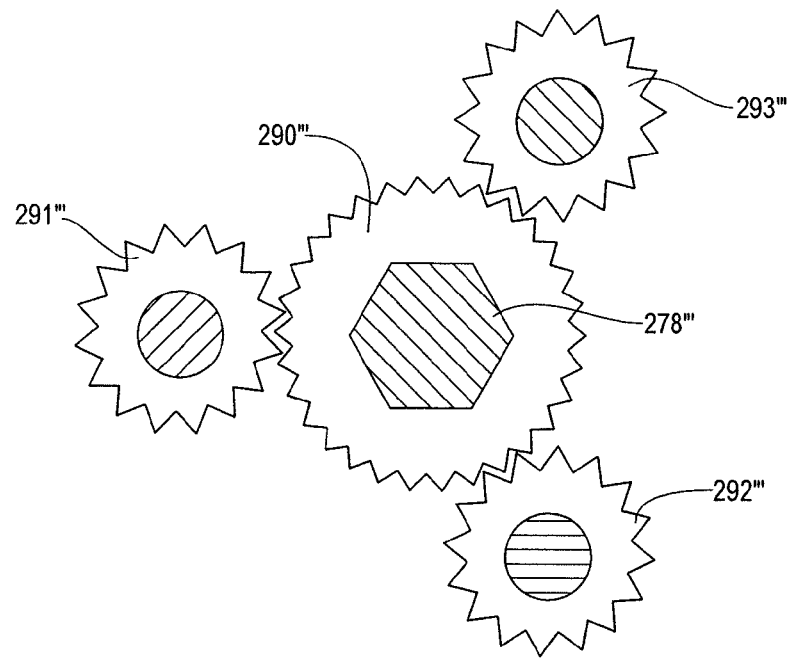
FIG. 27 is a top plan representational view of the primary and secondary gears and arbor key of the indexer illustrated in FIGS. 25 and 26.

As illustrated in FIGS. 25-27, for instance, the indexer 200''' may be provided with gearing to enable the turret motor to be used to index the tools and to drive a driven tool. With reference to FIG. 25, the indexer 200''' is provided with a first milling tool 270''' in a 180° milling tool holder 274''' and a second milling tool 272''' in a 90° milling tool holder 276''' (a third tool holder is not shown). Tool holders 274''', 276''' in this illustration are intended as conventional tool holders. The tools 270''', 272''' and tool holders 274''', 276''' can be driven by secondary gears 291''', 292''', 293''' (293''' seen only in FIG. 27), which are, in turn, driven by a primary gear 290'''. The indexer 200''' of this embodiment includes an arbor 212''', a table 204''' on which the holders 274''', 276''' are mounted, and an arbor key 278''' that is affixed to or integral with the arbor 212''' and that rotates upon rotation of the arbor. In the illustrated embodiment, the arbor key 278''' is an integral end surface of the arbor 212'''.

A clutch mechanism (shown generally at 280''') includes a pair of clutch plates 282''', return springs 284''', and pads 286'''. The indexer is connected to a source of fluid by conduit 288''', which may be a separate hydraulic fluid or which may be machine coolant. As shown in FIG. 25, when there is no fluid pressure in the fluid conduit 288''', springs 284''' bias the plates 282''' against pads 286''', which in turn bias the primary gear 290''' and secondary gears 291, 292'''. In this position, when the arbor 212''' rotates, frictional engagement of the pads 286''' will cause the gears 290''', 291''', 292''' and table 204''' to rotate with the arbor 212''' as a unit. The arbor key 278''' is disengaged from the table 204'''. The key 287''' will itself rotate but will not drive rotation of the table 204'''.

When fluidic pressure is applied, as illustrated in FIG. 26, pressure of the coolant biases the plates 282''', which causes downward movement of the arbor 212''' and disengagement of the pads 286''' from the gears 290''', 291''', 292'''. The arbor key 278''' is integral with the arbor 212''' and hence is moved into position into a keyway 294''' in the primary gear 290'''. As seen in FIG. 27, the arbor key 278 and the keyway 294 are configured with complementary shapes to allow the arbor 212''' and the primary gear 290''' to be rotationally fixed when engaged. Now, upon rotation of the arbor 212''', the rotation of the arbor will drive the primary gear 290''', thus driving rotation of the secondary gears 291''', 292''' and hence rotation of the tools 270''', 272''' relative to the table 204'' (which remains stationary with respect to the turret). For the 90° milling tool holder 276''', a bevel gear arrangement (not shown) preferably is used.

The embodiment illustrated in FIGS. 25 and 26 further includes a clamping mechanism 295''' that includes coolant-pressure-engaged pistons 296''' and springs 297''' as before. In this embodiment, the pistons 296''' engage sockets 298''' in the turret 108 to thus inhibit vibration and unwanted movement of the arbor, table and tools. Alternatively the pistons could be arranged to engage the tool body which would itself be fastened to the turret. It is envisioned that the clutch pads may require periodic replacement to account for potential slippage in indexing operations.

Figure 28:
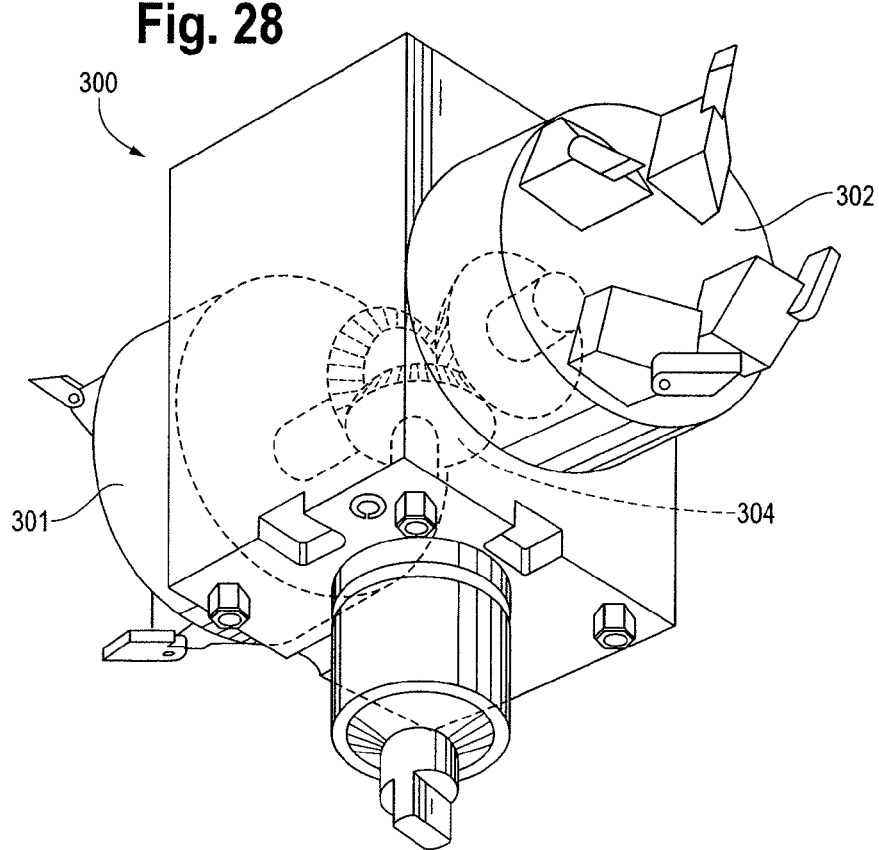
FIG. 28 is a front elevational view of another alternative tool indexer.

As seen in FIG. 28, the indexer 300 may be configured such that the axis of rotation of the table (two tables 301, 302 being illustrated) is orthogonal to the axis of rotation of the table in the heretofore described embodiments, i.e., parallel to the axis of rotation of the turret. The illustrated arrangement uses a bevel gear arrangement 304 internal to the indexer to cause rotation of the tables. This arrangement is deemed suitable for various operations including in particular ID turning operations, with a workpiece being disposed on the main spindle or a subspindle of the machine.

It is seen that, in this embodiment, the table may be freely rotated and clamping may be applied at any rotational position. In practice, it is contemplated that the rotation of the table will be indexed to a limited number of positions via machine control.

In some embodiments (not shown), the fluid used to actuate the clamping mechanism and clutch plate may be introduced into the machine as cooling fluid in a manner similar to that heretofore described. This arrangement permits driving of all of the tools on the table at the various tool stations, but one or more tools that are not driven (e.g., turning tools) could be provided, in which case there would be no operative driving linkage between the tool and secondary gear.

Many other variations of the machine and indexer may be provided. A turret may be provided with multiple tool indexers disposed respectively on different facets of the turret. A machine may be provided with multiple turrets or with multiple indexers disposed variously on a turret, on a headstock or main spindle, on a subspindle, on an upper spindle, or on a tailstock. The tools may be brought into engagement with one or more workpieces disposed for instance on a turret, on a headstock or main spindle, on a subspindle, on an upper spindle, or on a tailstock.

The indexer may be used in connection with tool life management techniques. Generally, in connection with the indexer, the invention contemplates in some embodiments determining whether a tool that is disposed in a working position has reached the end of its life cycle, and thereafter moving the indexer relative to the turret to bring a new tool into the working position. The tool (which in this instance contemplates a wearable tool insert on a permanent tool) may be determined to have reached the end of its life cycle via any suitable method, such as via a counter or via other algorithmic techniques. These embodiments of the invention can be implemented as a tangible computer-readable medium having computer-executable instructions for performing one or more of the heretofore indicated steps. In other embodiments the invention contemplates a method for performing these steps.

Figure 29:
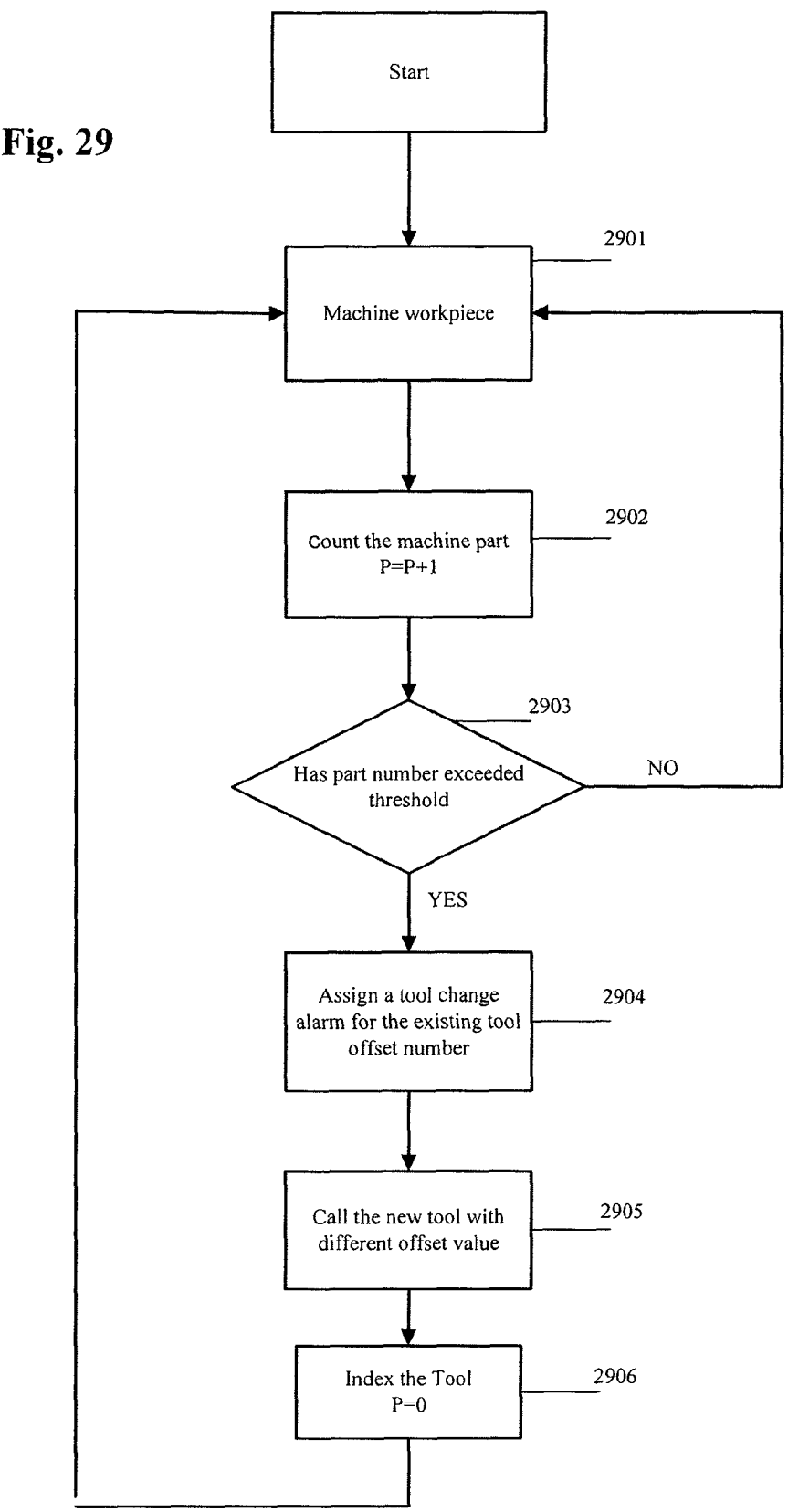
FIGS. 29 and 30 are flowcharts that represent steps in a method for managing tool life management using the indexer.

With reference to FIG. 29, for instance, at step 2901 the tool is used to machine a workpiece, and an incremental counter is increased at 2902. If, at step 2903, the number of machined pieces has increased beyond a predetermined threshold, a tool change alarm is assigned at step 2904, a new tool with a different offset value is called at step 2905 and indexed into an operating position, and the incremental counter reset at 2906. Machining then resumes at step 2901.

Figure 30:
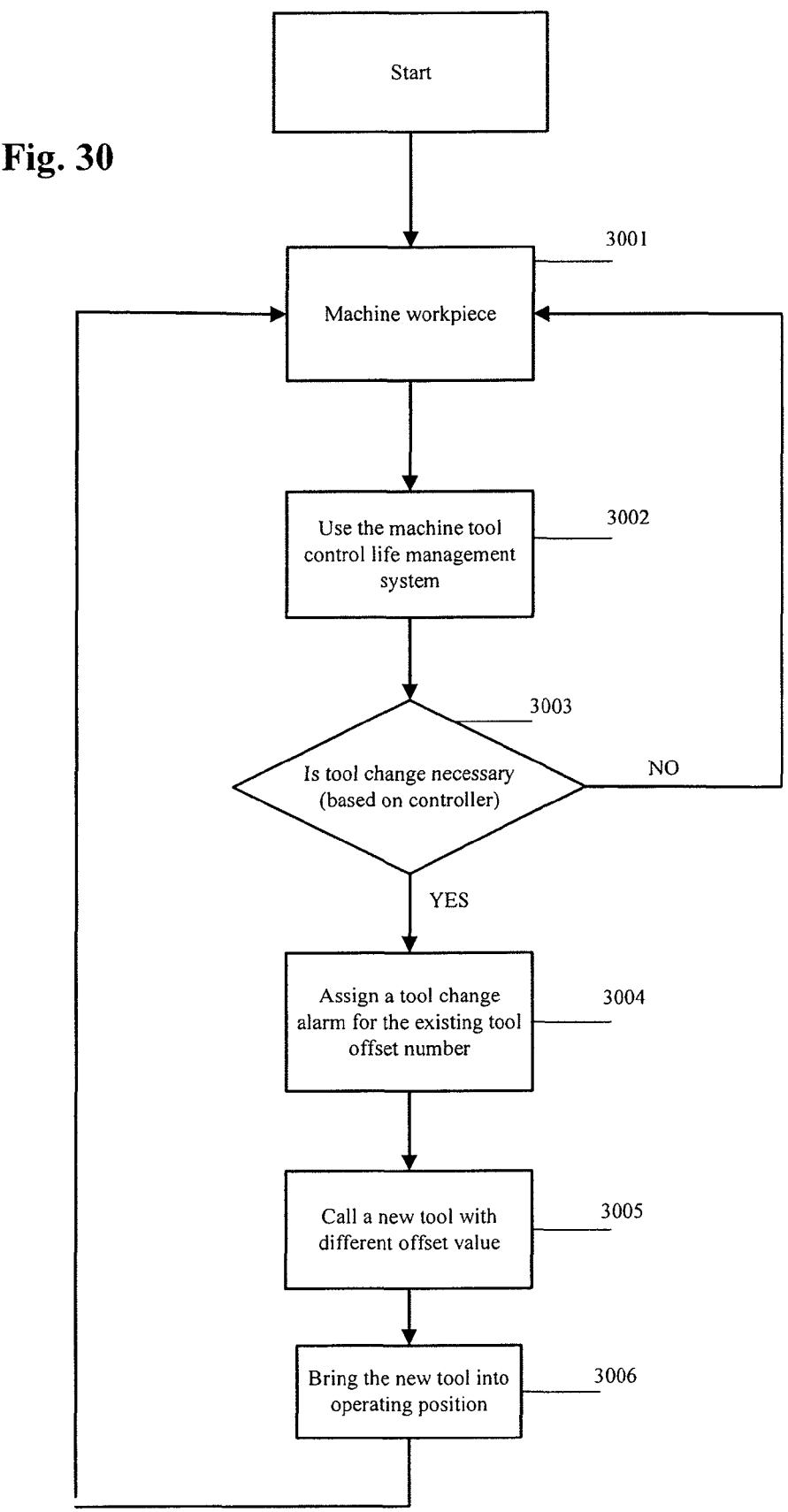

Alternatively, the indexer may be used in connection with a manufacturer's tool life algorithm, as purports to be disclosed, for instance, in U.S. Pat. No. 5,568,028. As set forth in FIG. 30, a workpiece is machined at step 3001, and the tool control life management system is used at step 3002 to determine whether tool life has been reached. If, at step 3003, a tool change is deemed necessary, the process continues as discussed above in steps 3004-3006. If necessary, each tool on the indexer may be assigned a separate offset, using the existing controller software or using Mori Seiki software. Mori Seiki presently employs software known as MAPPS which may be employed for this purpose.

It is thus seen that multiple tools may be provided on an indexer.

Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A turret-indexer assembly for a machine tool having a workpiece holder configured to secure a workpiece, the turret-indexer assembly comprising:

a turret movable relative to the workpiece holder, the turret having plural turret connectors and being rotatable about a turret axis of rotation to expose one of the turret connectors to at least one working position; and an indexer disposed on one of the turret connectors, the indexer including a table rotatable about a table axis of rotation orthogonal or parallel to the turret axis of rotation, and a plurality of tool stations disposed on the table and configured respectively to receive a plurality of cutting tool structures configured to remove material from the workpiece, the indexer being configured to index one of the tool stations to a predetermined rotational position by rotating the table about the table axis of rotation when the indexer has been indexed to the working position by rotation of the turret.

2. The turret indexer assembly of claim 1, in which the turret includes a hydraulic clamping mechanism including at least one clamping element capable of actuation to cause movement of the element to a clamping position in which the clamping element engages the indexer thereby to fix the table.

3. An apparatus comprising:

a workpiece holder configured to secure a workpiece; and
a turret-indexer assembly including:

a turret having plural turret connectors, the turret being supported for rotation about a turret axis of rotation to expose a selected one of the turret connectors to at least one working position; and an indexer disposed on one of the turret connectors, the indexer including a table supported for rotation about a table axis of rotation orthogonal or parallel to the turret axis of rotation, and a plurality of tool stations disposed on the table and configured respectively to receive a plurality of cutting tool structures configured to remove material from the workpiece, the indexer being configured to index one of the tool stations to a predetermined rotational position by rotating the table about the table axis of rotation when the indexer is indexed to the working position by rotation of the turret and is therefore in the working position;

the workpiece holder and the turret-indexer assembly being movable relative to one another to permit selective engagement and disengagement of the tool structure retained on the turret-indexer assembly with a workpiece disposed in the workpiece holder; and a computer control system comprising a computer readable medium having computer-executable code disposed thereon, the control system being operatively coupled to the turret-indexer assembly and to the workpiece holder and comprising code for causing relative movement of the turret-indexer assembly and the workpiece holder and further comprising code for indexing one of the tool stations to a predetermined rotational position by rotating the table.

4. The apparatus of claim 3, in which the turret includes a hydraulic clamping mechanism including at least one clamping element capable of actuation to cause movement of the element to a clamping position in which the clamping element engages the indexer thereby to fix the table; and in which the computer control system comprises code for causing actuation of the clamping element.

* * * * *